United States Patent
Tashiro et al.

(10) Patent No.: US 6,794,078 B1
(45) Date of Patent: Sep. 21, 2004

(54) FUEL CELL, FUEL CELL SEPARATOR, AND METHOD OF MANUFACTURE THEREOF

(75) Inventors: Noriji Tashiro, Mito (JP); Atsushi Fujita, Hitachi (JP); Tomonori Seki, Hitachi (JP); Harufumi Hasuda, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 10/148,799

(22) PCT Filed: Dec. 6, 1999

(86) PCT No.: PCT/JP99/06817

§ 371 (c)(1),
(2), (4) Date: Jun. 5, 2002

(87) PCT Pub. No.: WO01/43217

PCT Pub. Date: Jun. 14, 2001

(51) Int. Cl.[7] .......................... H01M 8/02; H01M 2/16; C08K 3/04
(52) U.S. Cl. .................. 429/34; 429/247; 429/253; 29/623.1; 524/495; 524/496; 442/111
(58) Field of Search .......................... 429/34, 247, 253; 29/623.1; 428/408, 244; 524/495, 496; 442/111

(56) References Cited

U.S. PATENT DOCUMENTS

| | | | | |
|---|---|---|---|---|
| 4,339,322 A | * | 7/1982 | Balko et al. | 204/255 |
| 4,579,789 A | * | 4/1986 | Fukuda et al. | 429/44 |
| 4,670,300 A | * | 6/1987 | Stewart, Jr. | 427/115 |
| 5,776,372 A | * | 7/1998 | Saito et al. | 252/511 |
| 5,856,035 A | * | 1/1999 | Khandkar et al. | 429/32 |
| 5,885,728 A | * | 3/1999 | Mercuri et al. | 429/30 |

FOREIGN PATENT DOCUMENTS

| | | | | | |
|---|---|---|---|---|---|
| EP | 0784352 A1 | * | 7/1997 | ............ | H01M/8/02 |
| JP | 60-0995858 A | * | 5/1985 | ............ | H01M/4/36 |
| JP | 60-118618 A | * | 6/1985 | ............ | C01B/31/04 |
| JP | 60118744 A | * | 6/1985 | ........ | C08L/101/00 |
| JP | 61-007570 A | * | 1/1986 | ............ | H01M/8/02 |
| JP | 61-010872 A | * | 1/1986 | ............ | H01M/8/02 |
| JP | 62-133674 A | * | 6/1987 | ............ | H01M/8/02 |
| JP | 62-274559 | | 11/1987 | | |
| JP | 63-012663 A | * | 1/1988 | ............ | C08K/7/04 |
| JP | 62-128441 A | * | 12/1988 | ............ | H01B/5/16 |
| JP | 63-318075 | | 12/1988 | | |
| JP | 01-311570 A | * | 12/1989 | ............ | H01M/8/02 |
| JP | 02-112161 A | * | 4/1990 | ............ | H01M/8/02 |
| JP | 04-046947 | | 2/1992 | | |
| JP | 04-046947 A | * | 2/1992 | ............ | C08L/61/06 |
| JP | 5-74469 | | 3/1993 | | |
| JP | 6-505693 | | 6/1994 | | |
| JP | 6-183836 | | 7/1994 | | |
| JP | 06-330743 | | 11/1994 | | |
| JP | 06349567 A | * | 12/1994 | ............ | H05B/3/14 |
| JP | 8-134249 | | 5/1996 | | |
| JP | 08-188407 | * | 7/1996 | ............ | C01B/31/04 |
| JP | 9-161827 | | 6/1997 | | |
| JP | 10-3931 | | 1/1998 | | |
| JP | 10-040937 | * | 2/1998 | ............ | H01M/8/02 |
| JP | 10245214 A | * | 9/1998 | ............ | C01B/31/04 |

(List continued on next page.)

OTHER PUBLICATIONS

Abstract of JP 60–012672 A, Published Jan. 23, 1985.*

*Primary Examiner*—Gregg Cantelmo
(74) *Attorney, Agent, or Firm*—Antonelli, Terry, Stout & Kraus, LLP

(57) ABSTRACT

A fuel-cell separator comprising a resin and an electric conductor dispersed in the resin is produced by thermally molding a mixture comprising the electric conductor and the resin.

53 Claims, 6 Drawing Sheets

FOREIGN PATENT DOCUMENTS

| | | |
|---|---|---|
| JP | 10-308226 | 11/1998 |
| JP | 10-325508 | 12/1998 |
| JP | 11-028461 | 2/1999 |
| JP | 11-297337 A * | 10/1999 ............ H01M/8/02 |
| JP | 11-354135 A * | 12/1999 ............ H01M/8/02 |
| JP | 2000-21423 | 1/2000 |
| JP | 2000-017179 | 1/2000 |
| JP | 2000-48830 | 2/2000 |
| WO | WO 92/16470 | 10/1992 |
| WO | WO 9216470 A1 * | 10/1992 ........... B29C/71/02 |

* cited by examiner

FUEL CELL, FUEL CELL SEPARATOR, AND METHOD OF MANUFACTURE THEREOF

TECHNICAL FIELD

The present invention relates to a fuel cell, a fuel-cell separator for separating the fuel gas and oxidizer gas (air or oxygen) in a fuel cell and a method of producing the fuel-cell separator.

BACKGROUND ART

Recently, the considerably increasing consumption of fossil fuels for automobile or the like has caused various problematic environmental disruptions due to the large amounts of various waste gases generating on combustion of the fuels. As a means for solving the problem, fuel cells, being a safe and pollution-free energy generating system, have become of major interest and been actively studied and developed on the worldwide level, and some are put to practical use.

Because of their high energy efficiency, fuel cells can reduce environmental pollution and are expected to be widely used as small dynamos or the power supply for EVs. It is the principle of fuel cells to develop a potential difference by the conversion of chemical energy to electric energy through the oxidation and reduction of a fuel gas and an oxidizer gas (air or oxygen) which are allowed to flow separately over electrodes (positive electrode and negative electrode) attached on the upper and lower sides of an electrolyte layer, and the transfers of cations and electrons in the electrolyte layer. Because fuel cells are produced by piling up electrodes and electrolyte layers alternately in multi-layers, separating plates (separators) for separating the fuel gas from the oxidizer gas are interposed between positive electrodes and negative electrodes which are placed one on the other. To secure gas feed paths, separators generally have ribs (projecting parts; adjoining ribs form a groove therebetween which works as a path for a gas, such as hydrogen or oxygen, or product water). Charge collector plates surrounding the multi-layered electric cells collect the potential difference developed in each electric cell.

Among the members constructing a fuel cell that are important and occupy a majority are the separators, which perform important tasks influencing the characteristics of fuel cells, for example, stable supply of gases (oxygen, hydrogen or the like) to catalysts and electrolyte layers and immediate discharge of the product water out of the system. Separators, therefore, require various properties, including 1) separation of fuel gases from oxidizer gases (gas non-permeability), 2) electric conductivity and 3) resistance to swelling with water produced on negative electrodes or with electrolytic solutions.

Separators have generally been produced by mechanically grooving a graphite block or glassy carbon to form ribs, thereby providing feed paths for fuel gases and oxidizer gases. An alternative is high pressure molding of an expanded-graphite or an expanded-graphite sheet produced by treating a flaky natural graphite with acid and then with heat, or by impregnating the molded expanded-graphite with a liquid thermosetting resin and curing to prevent swelling with liquids (Japanese Patent Application Non-examined Publication Nos. 60-65781 and 60-12672).

Disclosed in the specification of International Publication No. WO97/02612 is a method wherein an expanded-graphite powder of specific particle diameters is dispersed in a thermoplastic or thermosetting resin, molded into a block and then mechanically grooved.

The methods using various machining techniques are costly because they need highly accurate cutting machines or techniques, a very long machining time or a tremendous labor, for example, impregnating the cutting-processed separators with resins by using a vacuum drier. Further, the separators cut out of graphite plates are thick, and have the defect that each separator is so heavy as to problematically increase the weight per fuel cell (generally containing several hundreds of separators). This causes energy loss when fuel cells are fabricated in cars or the like. Additional drawbacks of the separators cut out of graphite plates are hardness and fragility. When several hundreds of separators are stacked and clamped to prevent a gas leak, some are often broken under the clamping pressure. The methods using the expanded-graphite involve the problems that moldable ribs are limited in dimension, and the products apt to swell with the gas generated during molding and cannot be supplied stably.

The separator disclosed in the specification of International Publication No. WO97/02612 has the defect that because the particles of the expanded-graphite powder used for production have small diameters and are very fragile and weak, the expanded-graphite powder is crashed during mixing with resins and gives molded articles of poor strength.

DISCLOSURE OF THE INVENTION

Accordingly, an object of the invention is to provide a fuel-cell separator which is free from problems relating to the properties of fuel-cell separators, such as electric resistance, gas permeability, swelling with liquids and mechanical strength, and is very moldable and economical.

Another object of the invention is to provide a ribbed fuel-cell separator which is further improved in that it can be made lighter because its plate part can be thinned even for high ribs.

Another object of the invention is to provide a fuel-cell separator which is further improved in dimensional accuracy.

Another object of the invention is to provide a fuel-cell separator which is further improved particularly in electrical properties and mechanical strength.

Another object of the invention is to provide a method for economically and stably producing through simple steps a fuel-cell separator which is free from problems relating to the properties of fuel-cell separators such as electric resistance, gas permeability, swelling with liquids and mechanical strength, and has good moldability.

Another object of the invention is to provide a method for producing a fuel-cell separator by using a resin which cures readily without troubles such as corrosion of molds.

Another object of the invention is to provide a further improved method for producing a fuel-cell separator which is particularly excellent in electric properties and mechanical strength.

Another object of the invention is to provide a fuel cell of high quality which contains fuel-cell separators excelling in the properties of fuel-cell separators relating to electric resistance, gas permeability, swelling with liquids and mechanical strength.

Another object of the invention is to provide a fuel cell which is further improved in stably maintaining its cell-properties during a long-term usage.

Accordingly, the invention relates to the following subjects.

(1) A fuel-cell separator comprising a resin and an electric conductor dispersed in the resin.

(2) The fuel-cell separator as described in (1), wherein the electric conductor is a powdery electric conductor having an average particle diameter of 25 μm or more.

(3) The fuel-cell separator as described in (1) or (2), wherein the electric conductor is an expanded-graphite powder.

(4) The fuel-cell separator as described in (3), wherein the expanded-graphite powder has a sulfuric acid ion ($SO_4^{2-}$) concentration of 500 ppm or less.

(5) The fuel-cell separator as described in any one of (1) to (3), wherein the resin is a cured phenolic resin.

(6) The fuel-cell separator as described in (5), wherein the resin is a cured phenolic resin cured by ring-opening-polymerization.

(7) The fuel-cell separator as described in any one of (1) to (6), which has a shape of a ribbed-plate formed by monobloc-molding a plate and ribs.

(8) The fuel-cell separator as described in (7), wherein the ribs have a height of 0.3 mm or more.

(9) The fuel-cell separator as described in (7), wherein the ribs have a height of 0.6 mm or more.

(10) The fuel-cell separator as described in any one of (7) to (9), wherein the ratio of the height (A) of the ribs to the thickness (B) of the plate, (A/B), is 0.5 or more.

(11) The fuel-cell separator as described in any one of (7) to (10), which has the ribs on one side of the plate.

(12) The fuel-cell separator as described in any one of (7) to (11), which has the ribs on both sides of the plate.

(13) The fuel-cell separator as described in any one of (7) to (12), wherein the plate has a thickness of 0.25 mm to 2.0 mm.

(14) The fuel-cell separator as described in any one of (7) to (13), wherein the ribs are tapered at an angle of 2° to 30°.

(15) The fuel-cell separator as described in (14), wherein the ribs are tapered at an angle of 2° to 20°.

(16) The fuel-cell separator as described in any one of (1) to (15), which has a bending strength of 30 MPa or more.

(17) The fuel-cell separator as described in (16), wherein the electric conductor comprises a carbon fiber and an expanded-graphite powder.

(18) The fuel-cell separator as described in any one of (1) to (16), wherein the electric conductor is a powdery electric conductor having a flaky branched-needle-like shape or a dendritic shape.

(19) The fuel-cell separator as described in any one of (1) to (18), wherein the dispersed electric conductor is oriented partially in a direction of the thickness of the fuel-cell separator and partially in a direction perpendicular to the direction of the thickness.

(20) The fuel-cell separator as described in any one of (1) to (19) that has a surface in and near which the electric conductor dispersed in the resin is oriented along the surface.

(21) The fuel-cell separator as described in (19) or (20), wherein the oriented electric conductor lies in fibrous rows.

(22) The fuel-cell separator as described in any one of (1) to (21), wherein the dispersed electric conductor partially lies in tangled fibrous rows.

(23) The fuel-cell separator as described in any one of (1) to (22), which is to be used in a solid-polymer fuel cell.

(24) The fuel-cell separator as described in any one of (1) to (23), which has a residual carbolic acid concentration of 100 ppm or less.

(25) The fuel-cell separator as described in any one of (1) to (24), which has a residual sulfuric acid ion ($SO_4^{2-}$) concentration of 200 ppm or less.

(26) A phosphoric acid-fuel-cell separator produced from the fuel-cell separator as described in any one of (1) to (25) by carbonizing the resin contained in the fuel-cell separator.

(27) A fuel-cell separator, which has a bending strength of 30 MPa or more.

(28) The fuel-cell separator as described in (27), which has a shape of a ribbed-plate formed by monobloc-molding a plate and ribs.

(29) The fuel-cell separator as described in (28), wherein the ribs have a height of 0.3 mm or more.

(30) The fuel-cell separator as described in (29), wherein the ribs have a height of 0.6 mm or more.

(31) The fuel-cell separator as described in any one of (28) to (30), wherein the ratio of the height (A) of the ribs to the thickness (B) of the plate, (A/B), is 0.5 or more.

(32) The fuel-cell separator as described in any one of (28) to (31) that has the ribs on one side of the plate.

(33) The fuel-cell separator as described in any one of (28) to (31) that has the ribs on both sides of the plate.

(34) The fuel-cell separator as described in any one of (28) to (33), wherein the plate has a thickness of 0.25 mm to 2.0 mm.

(35) The fuel-cell separator as described in any one of (28) to (34), wherein the ribs are tapered at an angle of 2° to 30°.

(36) The fuel-cell separator as described in (35), wherein the ribs are tapered at an angle of 2° to 20°.

(37) The fuel-cell separator as described in any one of (27) to (36), which comprises a fibrous material, an expanded-graphite powder and a resin, wherein the fibrous material and the expanded-graphite powder are dispersed in the resin.

(38) The fuel-cell separator as described in (37), wherein the expanded-graphite powder has an average particle diameter of 25 μm or more.

(39) The fuel-cell separator as described in (37) or (38), wherein the expanded-graphite powder has a sulfuric acid ion ($SO_4^{2-}$) concentration of 500 ppm or less.

(40) The fuel-cell separator as described in any one of (37) to (39), wherein the resin is a cured phenolic resin.

(41) The fuel-cell separator as described in (40), wherein the resin is a cured phenolic resin cured by ring-opening-polymerization.

(42) The fuel-cell separator as described in any one of (37) to (41), wherein the expanded-graphite powder has a flaky branched-needle-like shape or a dendritic shape.

(43) The fuel-cell separator as described in any one of (37) to (42), wherein the dispersed, expanded-graphite powder is oriented partially in a direction of the thickness of the fuel-cell separator and partially in a direction perpendicular to the direction of the thickness.

(44) The fuel-cell separator as described in any one of (37) to (44) that has a surface near which the dispersed, expanded-graphite powder is oriented along the surface.

(45) The fuel-cell separator as described in (43) or (44), wherein the expanded-graphite powder is oriented in fibrous rows.

(46) The fuel-cell separator as described in any one of (37) to (45), wherein the dispersed expanded-graphite powder partially lies in tangled fibrous rows.

(47) The fuel-cell separator as described in any one of (27) to (46), which is to be used in a solid-polymer fuel cell.

(48) The fuel-cell separator as described in any one of (27) to (47), which has a residual carbolic acid concentration of 100 ppm or less.

(49) The fuel-cell separator as described in any one of (27) to (48), which has a residual sulfuric acid ion ($SO_4^{2-}$) concentration of 200 ppm or less.

(50) A phosphoric acid-fuel-cell separator produced from the fuel-cell separator as described in any one of (27) to (49) by carbonizing the resin.

(51) A method of producing the fuel-cell separator as described in (1), comprising thermally molding a mixture comprising an electric conductor and a resin.

(52) The method of (51) for producing the fuel-cell separator, wherein the electric conductor is an expanded-graphite powder.

(53) The method of (51) for producing the fuel-cell separator, wherein the electric conductor comprises a carbon fiber and an expanded-graphite powder.

(54) The method of (52) or (53) for producing the fuel-cell separator, wherein the expanded-graphite powder has a bulk density of 0.1 to 1.0 g/cm$^3$.

(55) The method of (52), (53) or (54) for producing the fuel-cell separator, wherein the expanded-graphite powder has an average particle diameter of 25 μm or more.

(56) The method of any one of (52) to (55) for producing the fuel-cell separator, wherein the expanded-graphite powder is obtained by pulverizing a molded, expanded-graphite.

(57) The method of (56) for producing the fuel-cell separator, wherein the molded, expanded-graphite has a density of 0.6 to 2.0 g/cm$^3$.

(58) The method of any one of (51) to (57) for producing the fuel-cell separator, wherein the resin has a softening point of 300° C. or lower.

(59) The method of any one of (52) to (58) for producing the fuel-cell separator, wherein the expanded-graphite powder has a sulfuric acid ion ($SO_4^{2-}$) concentration of 500 ppm or less.

(60) The method of (59) for producing the fuel-cell separator, wherein the expanded-graphite powder is obtained by pulverizing a molded, expanded-graphite molded article, by washing it with water and drying.

(61) The method of (59) for producing the fuel-cell separator, wherein the expanded-graphite powder is obtained by heat-treating a molded, expanded-graphite at a temperature of 350° C. or higher and then pulverizing it after cooling.

(62) The method of (59) for producing the fuel-cell separator, wherein the expanded-graphite powder is obtained by pulverizing a molded, expanded-graphite and then heat-treating it at a temperature of 350° C. or higher.

(63) The method of any one of (51) to (62) for producing the fuel-cell separator, wherein the fuel-cell separator has a shape of a ribbed-plate, and wherein the thermal molding is accomplished by monobloc-molding ribs and a plate with heat and pressure.

(64) The method of any one of (51) to (63) for producing the fuel-cell separator, comprising a pre-molding step wherein the mixture comprising the electric conductor and the resin is compressed at a temperature at which the resin does not melt nor cure; and a thermal molding step wherein a pre-molded article produced in the pre-molding step is compressed at a temperature at which the resin melts or cures.

(65) The method of (64) for producing the fuel-cell separator, wherein the pre-molding is carried out at a temperature not lower than 0° C. but lower than 80° C.

(66) The method of any one of (51) to (63) for producing the fuel-cell separator, wherein the thermal molding of the mixture comprising the electric conductor and the resin is accomplished by molding the mixture comprising the electric conductor and the resin into a tablet, and full-molding the tablet at a higher temperature under a higher pressure than the temperature and the pressure of the tablet molding.

(67) The method of (66) for producing the fuel-cell separator, wherein the molding for producing the tablet is carried out at a temperature at which the resin partially melts or reacts with heat.

(68) The method of any one of (51) to (67) for producing the fuel-cell separator, wherein the fuel-cell separator is to be used in a solid-polymer fuel cell.

(69) The method of any one of (51) to (68) for producing the fuel-cell separator, wherein a molded article obtained by the thermal molding is further heated at a temperature of 200° C. or higher.

(70) A method of producing the fuel-cell separator of (50), wherein the fuel-cell separator is to be used in a phosphoric acid-type fuel cell, and which comprises thermally molding a mixture comprising the electric conductor and the resin, and then carbonizing the resin.

(71) A fuel cell having the fuel-cell separator of any one of (1) to (25).

(72) The fuel cell as described in (71), which is a solid-polymer fuel cell.

(73) A fuel cell having the fuel-cell separator of (26).

(74) The fuel-cell as described in (73), which is a solid-polymer fuel cell.

(75) A fuel cell having the fuel-cell separator of any one of (27) to (49).

(76) The fuel cell as described in (75), which is a solid-polymer fuel cell.

(77) A fuel cell having the fuel-cell separator produced by the method of (50).

(78) The fuel cell as described in (77), which is a solid-polymer fuel cell.

(79) A fuel cell having the fuel-cell separator produced by the method of any one of (51) to (69).

(80) The fuel cell as described in (79), which is a solid-polymer fuel cell.

(81) A fuel cell having the phosphoric acid-type fuel-cell separator produced by the method of (70).

(82) The fuel cell as described in (81), which is a solid-polymer fuel cell.

EXPLANATION OF SYMBOLS

1, 1a, 1b: fuel-cell separator, 2: rib, 3: groove, 4: plate, 5: positive electrode, 6: fuel gas passage, 7: negative electrode, 8: oxidizer gas passage, 9: electrolyte layer, 10: cell, 11: solid-polymer electrolyte film, 12: fuel electrode, 13: air electrode, 14: three-layered film, 15: cell stack

BEST MODE FOR CARRYING OUT THE INVENTION

Figure 1A:
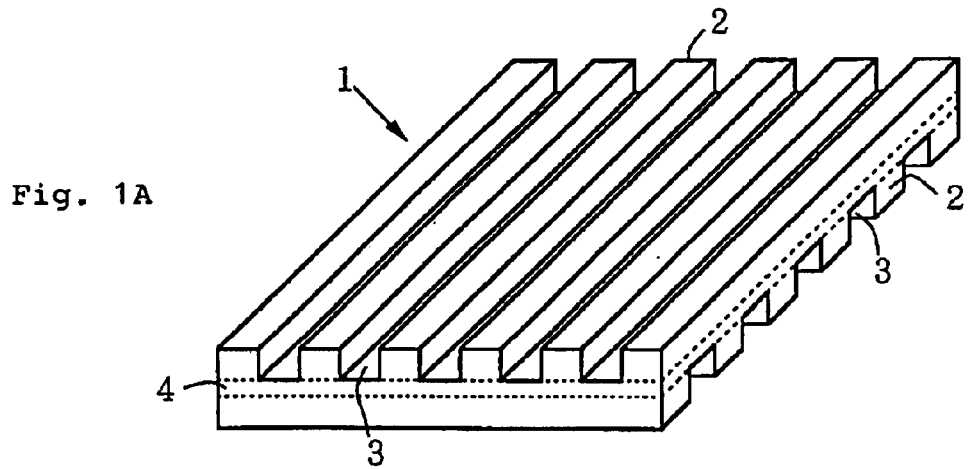
FIG. 1A and FIG. 1B each are perspective views of fuel-cell separators of embodiments according to the invention, FIG. 1A showing a fuel-cell separator having ribs on both sides, and FIG. 1B a fuel-cell separator having ribs on one side.
Figure 1B:
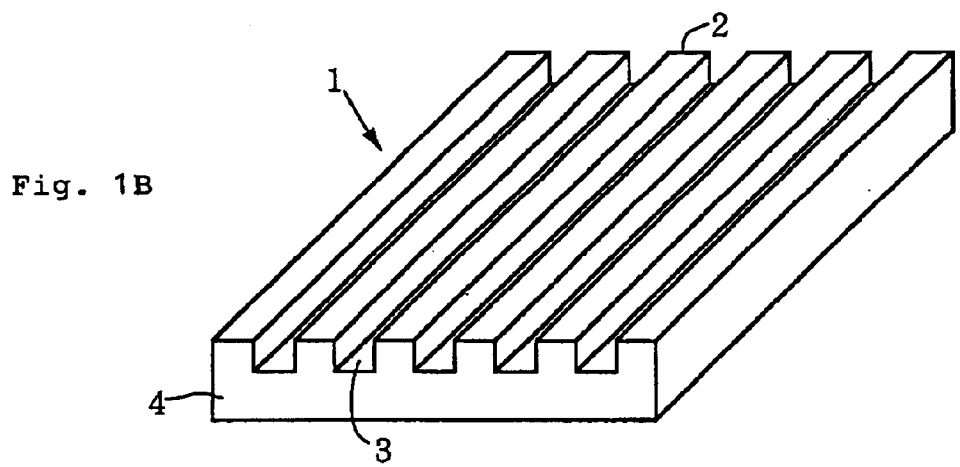

The fuel-cell separator of the invention generally has one or more ribs to provide grooves for securing passages for reaction gases. FIG. 1A and FIG. 1B each are perspective views showing fuel-cell separators of two embodiments according to the invention. Fuel-cell separator 1 of FIG. 1A has a shape consisting of plate 4 between the dot lines and plural ribs 2 vertically rising out of both sides of plate 4. Ribs 2 formed on one side (the upper face) of plate 4 are parallel to each other, and ribs 2 formed on the other side (the lower face) are also parallel to each other but perpendicular to ribs 2 on the upper face. Grooves 3 each formed between adjoining ribs 2 provide feed paths for reaction gases. The direction of ribs on the upper face and that of ribs on the lower face are not particularly limited, and may be different from each other as shown in FIG. 1A or may be the same. Fuel-cell separator of FIG. 1B has ribs 2 on one side. According to the invention, a fuel-cell separator of a good shape such as the above-described ones can be produced by direct molding using a mold of a desired shape without mechanically grooving a previously molded article.

The fuel-cell separator of the invention is a molded article wherein an electric conductor is dispersed in a resin. Examples of the electric conductor include powders of various metals and carbon materials, and preferred are carbon materials which are inexpensive and contribute good conductivity. As to the shape of the electric conductor, powdery electric conductor or fibrous electric conductor is desirable. Preferred examples of the carbon materials include natural-graphite powder, expanded-graphite powder and carbon fibers, with expanded-graphite powder preferred because of its excellence in mechanical strength, electric resistance and gas-impermeability.

Expanded-graphite powder may be produced by known methods, for example, by treating as follows a raw-material graphite with an acid material and an oxidizer.

Preferred raw materials for expanded-graphite powder are highly crystallized graphites, such as natural graphite, kish graphite and thermal cracking graphite. Natural graphite is preferred as being well balanced in properties and economy. Usable natural graphites are not particularly limited, and F48C (trade name, produced by Nippon Kokuen Co., Ltd.), H-50 (trade name, produced by Chuetsu Kokuen Co., Ltd.) and 599 (trade name, produced in the People's Republic of China) are commercially available.

The acid material generally usable for treating raw-material graphites is sulfuric acid, nitric acid, or a mixture of sulfuric acid and nitric acid. The acid material preferably has an acid concentration of 95% by weight or more. The quantity of the acid material used is not particularly limited and depends on the desired expansion factor, and is for example 100 to 1,000 parts by weight per 100 parts by weight of graphite. Examples of the oxidizer usable together with the acid material include hydrogen peroxide, potassium chlorate, potassium permanganate and potassium dichromate, and hydrogen peroxide is preferable to obtain a good expanded-graphite powder. The concentration of hydrogen peroxide in an aqueous hydrogen peroxide solution is not particularly limited, preferably 20 to 40% by weight. Its quantity is not particularly limited, and is preferably 5 to 60 parts by weight of aqueous hydrogen peroxide solution per 100 parts by weight of graphite.

For example, the treatment for producing an expanded-graphite is accomplished by dipping the above-described graphite in the above-described acid material, adding thereto the above-described oxidizer to form a graphite intercalation complex, which is then washed with water and heated rapidly to expand it in the direction of C-axis of graphite crystals. The rapid heating is preferably performed by drying the washed graphite intercalation complex, and then heating it for 5 seconds to 5 minutes in a heating furnace of 800 to 1,000° C. This gives a compressible expanded-graphite powder whose particles are elongated through expansion in the C-axis direction and non-directionally entangled in a complicated way.

The obtained expanded-graphite may be used as it is, but is preferably compression-molded or rolled into a molded article of the optimum density such as a sheet and is then pulverized to use it as an expanded-graphite powder.

The average particle diameter of the powdery electric conductor, such as the expanded-graphite powder, is preferably 25 $\mu$m or more, and, for the purposes of economy and improvements in properties relating to electric resistance, gas permeability, swelling with liquids and mechanical strength, more preferably 50 $\mu$m or more, further preferably 50 to 500 $\mu$m, further preferably 80 to 500 $\mu$m, particularly preferably 80 to 200 $\mu$m. The average particle diameter herein is a number average particle diameter and may be determined with particle size distribution measuring instruments of various kinds, such as SALD-3000J (produced by Shimazu Corp. (in examples described later, SALD-3000J was used).

The average particle diameter of the powdery electric conductor in the product fuel-cell separator may be determined by cutting the fuel-cell separator, observing the powdery electric conductor appearing on the cutting-plane by an electron microscope, randomly choosing 10 to 100 particles, measuring the size of each by common means, and calculating the average value. Alternatively, the powdery electric conductor is extracted from the fuel-cell separator, and its average particle diameter is determined with the above-mentioned particle size distribution-measuring instrument. As to the method of extraction, in case where the resin is soluble in a solvent, the powdery electric conductor can be extracted by dissolving the resin. In case where the resin is insoluble in solvents, some powdery electric conductors can be extracted by carbonizing the resin and removing it by sieving.

In case where the powdery electric conductor in the fuel-cell separator is glanular, its average particle diameter is preferably 25 µm or more. If it has an average particle diameter of less than 25 µm, the fuel-cell separator may have a high electric resistance and poor mechanical properties. The powdery electric conductor preferably has an average particle diameter of 1,000 µm or less, more preferably 80 µm to 800 µm further preferably 100 µm to 500 µm, particularly preferably 120 µm to 300 µm, most preferably 150 µm to 300 µm. In case where the powdery electric conductor is the above-described expanded-graphite powder, its particles tend to be crushed during thermal molding, and, in the fuel-cell separator, the diameters may become larger (about 1 to 3 times) than those measured before mixing with the resin. Further, the expanded-graphite powder sometimes changes to entangled fibers, and its particles become difficult to distinguish in electron micrographs. In such a case, the particle diameters may be measured, for example, after the resin is carbonized and removed by sieving.

Preferred expanded-graphite powders are obtainable by pulverizing a molded, expanded-graphite (such as an expanded-graphite sheet) having a density of 0.6 g/cm$^3$ to 2.0 g/cm$^3$, preferably 0.6 g/cm$^3$ to 1.8 g/cm$^3$. If a pulverized powder of a molded, expanded-graphite having a density of less than 0.6 g/cm$^3$ is used for the production of the fuel-cell separator, it may form complicated tangles of worm-like expanded-graphite and its particles also get more tangled, thereby disturbing the release of the internal gases (condensed water, formalin, etc.) generating from the resin during molding and causing internal voids. To the contrary, in case where a pulverized powder of a molded, expanded-graphite having a density of higher than 2.0 g/cm$^3$ is used, its particles may be excessively hardened and hardly form tangles of worm-like expanded-graphite and decrease the mechanical strength of the molded fuel-cell separator. The preferred density is 0.7 g/cm$^3$ to 1.7 g/cm$^3$. Herein, the density is calculated from the volume and weight of the molded article. The molded article adjusted to the optimum density is pulverized with a grinder to give an expanded-graphite powder. The pulverized expanded-graphite powder preferably has a bulk density of 0.1 to 1.0 g/cm$^3$, more preferably 0.1 to 0.4 g/cm$^3$, further preferably 0.1 to 0.2 g/cm$^3$. The bulk density may be determined, for example, by getting a 200-ml glass graduated cylinder full of an expanded-graphite powder, tapping it 50 times on a table from a height of about 2 cm while preventing spilling from the opening, and then calculating the bulk density from the volume and weight of the tapped expanded-graphite powder.

To prevent adverse effects on curing of resins and on molds such as corrosion, the expanded-graphite powder to be used in the invention preferably has a sulfuric acid ion ($SO_4^{2-}$) concentration of 500 ppm or less (0 to 500 ppm), more preferably 400 ppm or less, further preferably 300 ppm or less, particularly preferably 200 ppm or less.

For example, the sulfuric acid ion concentration may be determined by using an ion chromatograph spectrometer. That is, an expanded-graphite powder is added into hot water to sufficiently extract the residual sulfuric acid ions to determine the sulfuric acid ion concentration in the extract hot water with an ion chromatography spectrometer, and calculation is made from the determined value.

Expanded-graphite powders having the above-described sulfuric acid ion concentrations are obtainable through various methods.

For example, an expanded-graphite powder may be washed with water to decrease the sulfuric acid ion concentration. Subsequently, drying, preferably vacuum drying is carried out. The water used for washing may be of any temperature, and may be cold water or hot water. The method of washing is not particularly limited, but it is preferable to agitate an expanded-graphite powder in water with impellers attached to a motor. The quantity of the water used is not particularly limited, and is preferably 20 to 100 times the weight of the expanded-graphite powder. The treating time is not particularly limited, but the agitation is preferably continued for 5 to 30 minutes after the washing liquid is uniformly mixed with the expanded-graphite powder.

The washed expanded-graphite powder can be separated easily from the washing liquid by filtration under decreased pressure. After separation, the washed expanded-graphite powder is preferably dried at a vacuum of 700 to 760 mmHg by using a vacuum drier heated to 150° C. to 400° C., and the drying time is not particularly limited, but is preferably 30 minutes to 2 hours. Thus an expanded-graphite powder with decreased sulfuric acid ions is obtained.

Alternatively, the sulfuric acid ion concentration can also be decreased by compression molding an expanded-graphite, heat-treating the molded article at 350° C. or above, preferably 400° C. or above, more preferably 500 to 2,500° C., further preferably 550 to 1,000° C., cooling it and then grinding into an expanded-graphite powder, or by compression molding an expanded-graphite, pulverizing the molded article into an expanded-graphite powder and then heat-treating it at temperatures of the above-described range. Heat treatments at temperatures lower than 350° C. can scarcely reduce the sulfuric acid ions. The atmosphere for the heat treatment is not particularly limited. To prevent deterioration of the expanded-graphite due to oxidation, the heat treatment is preferably carried out in an atmosphere of relatively inexpensive nitrogen or a mixture of nitrogen and oxygen.

Figure 6:
FIG. 6 is an electron micrograph of 50 magnification showing the shape of an expanded-graphite powder of a coarse-grain type used to produce a fuel-cell separator of the invention.
Figure 7:
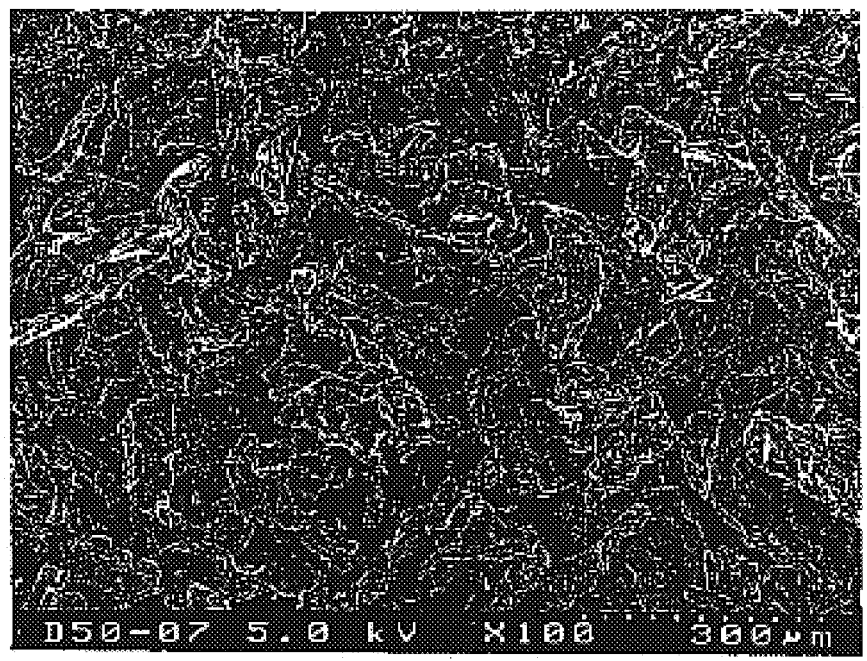
FIG. 7 is an electron micrograph of 100 magnification showing the shape of an expanded-graphite powder of a finely grained type used to produce a fuel-cell separator of the invention.

Electric conductors usable in the invention, such as expanded-graphite powders, may be of various shapes including spheres, plates, flaky grains and flakes and fibers. Shapes with many acute parts, such as a flaky branched-needle-like shape or dendritic shape (for example, powdery electric conductors having a flaky branched-needle-like shape or a dendritic shape) are desirable because such particles have many contacting points, and after molding, the electric conductors contact each other enough to contribute good conductivity. Examples of the flaky branched-needle-like shape or the dendritic shape are shown in FIG. 6 and FIG. 7. FIG. 6 is an electron micrograph of 50 magnification showing an expanded-graphite powder of a coarse-grain type with an average particle diameter of about 250 µm. FIG. 7 is an electron micrograph of 100 magnification showing an expanded-graphite powder of a fine-grain type with an average particle diameter of about 150 µm. Average particle diameters may be determined as described above by using various size distribution-measuring instruments.

The resin to be used together with the electric conductor for producing the fuel-cell separator of the invention is not particularly limited, may be thermosetting or thermoplastic, and is not particularly limited in its form (liquid or powder) and structure. For example, solventless liquid epoxy resins, solid epoxy resins, melamine resins acrylic resins, various phenolic resins, such as resols and novolaks, polyamide resins, powdery polyamldeimine resins and phenoxy resins may be used. These resins may optionally be used together with curing agents, cure accelerators and curing catalysts. For example, epoxy resins are used together with curing agents and cure accelerators, and novolak phenolic resins are used together with curing catalysts, such as hexamethylenetetramine. When the fuel-cell separator of the invention is produced by using a thermosetting resin, the resin in the fuel-cell separator is a cured product of the raw material resin.

Among these resins, phenolic resins are desirable because of their well-balanced properties and excellence in economy and processability.

The molecular weight of the raw material resin is not particularly limited and may be of any resin commonly used for thermal molding. For example, preferred thermosetting resins have number average molecular weights (which, for example, are determined by liquid chromatography) of 100 to 10,000, more preferably 250 to 4,000.

As to the form of the resin, powdery resins are desirable.

Any phenolic resin may be used, and, for example, by using phenolic resins curable through ring-opening-polymerization generate little gases on curing, fuel-cell separators having good properties are obtainable with excellent workability and moldability.

Preferred phenolic resins curable through ring-opening-polymerization are powdery resins, and resins containing the dihydrobenzoxazine ring represented by the general formula (I)

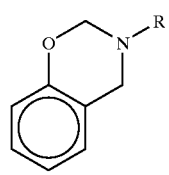

(I)

wherein R is a hydrogen atom or a monovalent substituent, and the dihydrobenzoxazine ring may further have 1 to 5 optional, monovalent substituents,
are desirable because of good moldability and excellent heat resistance. Such resins undergo ring-opening-polymerization on heating, to form crosslinked structures having good properties without requiring catalysts or curing agents nor generating volatile matters.

Preferred resins containing the dihydrobenzoxazine ring, contain chemical structure units of the general formula (A)

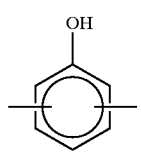

(A)

wherein hydrogen atoms on the aromatic ring may optionally be substituted by substituents except at one position ortho to the hydroxyl group, and chemical structure units of the general formula (B)

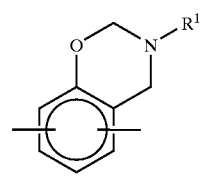

(B)

wherein $R^1$ is a hydrocarbon group, and hydrogen atoms on the aromatic ring may optionally be substituted by substituents,
because they effectively inhibit the generation of volatile gases, and the molar ratio of general formula (A)/general formula (B) is preferably 4/1 to 1/9, more preferably 3/1 to 1/8 in view of good heat resistance. For example, the ratio can be controlled by varying the ratios of the raw materials.

Preferred but non limitative examples of the substituents which may optionally substitute the hydrogen atoms on the aromatic rings in the chemical structure units of the general formulas (A) and (B) are alkyl groups of 1 to 10 carbon atoms, such as a methyl group, an ethyl group or a propyl group. In the general formula (A), at least one position ortho to the hydroxyl group is bonded to a hydrogen atom for curing. In the general formula (B), examples of the hydrocarbon groups for $R^1$ are those of 1 to 10 carbon atoms, such as a methyl group, an ethyl group, a cyclohexyl group, a phenyl group or a substituted phenyl group.

When the number of the chemical structure units of general formula (A) per molecule is m, and the number of the chemical structure units of general formula (B) per molecule is n, m may be 1 or more and n may be 1 or more, and m+n is preferably 3 to 10 in number average to improve the properties of the cured products such as heat resistance.

The chemical structure units may be directly bonded to each other or linked through various groups. The groups are preferably organic groups including hydrocarbon groups, such as an alkylene group or a xylylene group, for example, a group of the following formula:

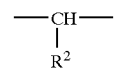

wherein $R^2$ is a hydrogen atom or a hydrocarbon group of 1 to 20 carbon atoms such as a methyl group, an ethyl group, a propyl group, an isopropyl group, a phenyl group or a substituted phenyl group,
and a linear alkylene group of 5 to 20 carbon atoms. For example, the group depends on the raw material compound having a phenolic hydroxyl group.

The resins containing the dihydrobenzoxazine ring may be synthesized, for example, from a compound having a phenolic hydroxyl group, a formaldehyde compound and a primary amine. For example, production of the resins having the dihydrobenzoxazine ring from these materials may be performed by adding a mixture of a compound having a phenolic hydroxyl group and a primary amine to a formaldehyde compound heated to 70° C. or higher, carrying out a reaction preferably at 70 to 110° C., more preferably 90 to 100° C., preferably for 20 to 120 minutes, and then drying the mixture preferably under a reduced pressure at 120° C. or lower.

Examples of usable compounds having a phenolic hydroxyl group include low molecular weight phenol compounds, for example bisphenol compounds, such as bisphenol A, bisphenol F and biphenol, trisphenol compounds and tetraphenol compounds, and phenolic resins. Examples of phenolic resins include novolak resins or resol resins which are the reaction products of a monovalent phenol compound, for example phenol or an alkylphenol, such as xylenol, t-butylphenol or octylphenol, or a polyvalent phenol compound, such as resorcinol or bisphenol A, with a formaldehyde compound; phenol-modified xylene resins, melamine-modified phenolic resins and polybutadiene-modified phenolic resins.

Phenolic resins available in the market may also be used, for example a resol phenolic resin marketed under the trade name of TD2040C (produced by Dainippon Ink & Chemicals, Inc.) and novolak phenolic resins marketed under the trade names of TD697 (produced by Dainippon Ink & Chemicals, Inc.) and HP491UP (produced by Hitachi Chemical Company, Ltd.).

Examples of usable formaldehyde compounds include not only formaldehyde but also compounds generating formaldehyde, such as formalin, paraformaldehyde and hexamethylenetetramine.

Examples of usable primary amines include aliphatic amines, such as methylamine and cyclohexylamine, and aromatic amines, such as aniline and substituted anilines. In view of heat resistance, aromatic amines are desirable.

The ratios of these materials used for the reaction is not particularly limited, but it is desirable to use 0.2 to 0.9 moles, preferably 0.3 to 0.8 moles of a primary amine per mole of the hydroxyl group (positioned ortho to at least one hydrogen) of the compound having a phenolic hydroxyl group, and a formaldehyde compound double the molar quantity of the primary amine.

In case where a powdery resin is used, it may have any particle size distribution, but preferably has a number average particle diameter of 1 $\mu$m to 1,000 $\mu$m, more preferably 1 $\mu$m to 1,000 $\mu$m, further preferably 5 $\mu$m to 500 $\mu$m, particularly preferably 5 to 100 $\mu$m, extremely preferably 5 to 50 $\mu$m, to facilitate mixing (particularly dry blending) with electric conductors, such as an expanded-graphite powder, and to optimize the resin flow at the time of molding.

Various kinds of thermosetting or thermoplastic resins may be used in the invention, and resins with softening points of 300° C. or lower, preferably 60 to 300° C., more preferably 80 to 250° C. are desirable, as exhibiting good adhesiveness to electric conductors when molded. Softening points may be determined by the ring and ball method.

The resin preferably has a gelling time as measured by the hot plate method of heating at 180° C. for 20 to 250 seconds more preferably 15 to 180 seconds.

For example, the fuel-cell separator of the invention may be produced by mixing the above-described resin and electric conductor, and molding and curing the mixture by using molds or the like. The molding temperature depends on resins, and in cases of phenolic resins, it is preferably 160 to 190° C. in view of molding fault and productivity. In general, the pressure for thermal molding is preferably 4 MPa to 30 MPa (bearing pressure), more preferably 6 MPa to 25 MPa, further preferably 8 MPa to 20 MPa. The time of thermal molding with heat and pressure is determined based on the reaction time of the resin at the molding temperature, and is generally 1 to 30 minutes, preferably 1 to 20 minutes, more preferably 5 to 15 minutes.

A range of 1 to 10 minutes is desirable. Preferably, a mold is heated to the above-described temperature, and the mixture is then charged therein and molded by applying pressure. This prevents the resin from unevenly melting and curing while the mold temperature is rising.

After the thermal molding, post cure may be carried out by heating at about 180 to 250° C., preferably 200 to 250° C., for 20 to 240 minutes, preferably 30 to 240 minutes.

The mixing ratio of the electric conductor/resin is preferably 95/5 to 30/70 (weight ratio), more preferably 95/5 to 40/60, further preferably 90/10 to 60/40, particularly preferably 90/10 to 70/30. If the electric conductor is mixed in a ratio of more than 95/5, a sharp decrease in mechanical strength tends to occur, and in a ratio of less than 30/70, electric conductivity tends to decrease.

The method of mixing the electric conductor and the resin is not particularly limited. For example, the powdery resin is dissolved in a solvent and adequately mixed with the electric conductor, and after the solvent is removed under such a condition that the powdery resin does not react, the resultant mixture is pulverized to a size suitable for molding; or an electric conductor and a powdery resin are mixed by dry blending (mixing by using a shaker or a mixer without solvents). Dry blending is desirable in view of cost and workability.

The resultant mixture may be molded by thermal molding. Any thermal molding technique may be employed, and examples of expedient techniques are compression molding and extrusion using a mold having the shape of the desired fuel-cell separator. An alternative is cutting a previously molded article into a fuel-cell separator of the desired shape and size. The fuel-cell separator is not particularly limited in size, thickness and shape. For example, as shown in FIG. 1A or FIG. 1B, it may be of a shape having grooves on both sides or one side to pass gases and ribs. Holes (through holes) may be made in the molded article depending on demands.

In another embodiment of the production method of fuel-cell separators according to the invention, a mixture of an electric conductor and a resin is pre-molded before the succeeding thermal molding. This reduces the volume of the mixture to be molded and improves workability, and as well remarkably reduces the air involved in the materials during mixing, thereby obviating defects, such as voids in the end molded article. Further, electric properties can be improved because the mutual contact of the particles of the expanded-graphite powder in the resin is previously increased. In this method, first the mixture is pre-molded by compressing it at a temperature at which the resin does not melt nor cure, for example a temperature not lower than 0° C. but lower than 80° C., preferably 0 to 75° C. A non-limitative example of usable pre-molding techniques is cold press molding (using a mold of room temperature).

The conditions of the cold press molding are not particularly limited. For example, a given quantity of a mixture is divided into several portions, which are sequentially charged into and repeatedly compressed in a mold for fuel-cell separator molding at room temperature, to give a pre-molded fuel-cell separator. The pressure for the pressing is not particularly limited, and is for example, 0.1 MPa to 3 MPa, preferably 0.1 MPa to 2 MPa, more preferably 0.1 MPa to 1 MPa in bearing pressure. The pre-molding may be carried out at any temperature as far as the resin does not melt nor cure, generally at room temperatures of 0° C. to 30° C.

The pre-molded article is then thermally molded by compressing it at a temperature at which the resin melts or cures. Thermal molding may be performed by directly heating the mold used for the pre-molding (without removing the pre-molded article) and applying a pressure again. To prevent the resin from unevenly melting or curing while the temperature of the mold is rising, the mold for fuel-cell separator molding is preferably sandwiched between the heating platens of a molding machine heated to 140° C. to 200° C. until the mold is heated up to the temperature, then taken out and loaded with the pre-molded fuel-cell separator to mold it by applying pressure. The pressure is preferably applied after whole the loaded pre-molded article is heated uniformly. Therefore, after loaded, the pre-molded article is preferably placed on a heating platen without applying pressure for about one minute before molding. The pressing pressure is not particularly limited, and is, for example, 4 MPa to 30 MPa, preferably 6 MPa to 20 MPa in bearing pressure.

The time of the thermal molding with heat and pressure is determined based on the reaction time of the resin at the molding temperature, and suitable time is generally 1 to 30 minutes, preferably 1 to 20 minutes, more preferably 5 to 15 minutes. The productivity can be further improved by using a multi-daylight press.

After the thermal molding, post cure may be carried out by heating at about 180 to 250° C. preferably 200 to 250° C., for 20 to 240 minutes, preferably 30 to 240 minutes.

In another embodiment of the production method according to the invention, a mixture of an electric conductor and a resin is molded at a low temperature into a tablet, which is then fully molded at a higher temperature with a higher pressure than those for the tablet molding. This method improves the production efficiency and makes it possible to produce inexpensive fuel-cell separators excelling in properties relating to dimensional accuracy, electric properties, mechanical strength, gas non-permeability and swelling with liquids.

In this method, the mixture of an electric conductor and a resin is molded into a tablet before the full-molding (thermal molding) into a fuel-cell separator. The technique for the tablet molding is not particularly limited, but molding with rolls or a compression molding machine is economical and gives dimensionally accurate tablets, strongly influencing the product fuel-cell separator.

The tablet must be molded at a lower temperature with a lower pressure than those for the succeeding full-molding. Molding at room temperature needs relatively high pressure for obtaining a tablet which stand handling, and gives thin tablets due to difficulty in adjustment of density (height). Thin tablets tend to cause short shot at the tops of ribs (projections) of the fully molded products, and hinder the stability in quality. If the molding is conducted at the same temperature as that of the full-molding, the resin may completely melt and excessively react, and it may become impossible to produce fuel-cell separators having complicated shapes even if pressure is applied in full-molding.

The conditions of the tablet molding depend on the time and pressure of the tablet molding, the melting point (softening point) and gelling time of the resin used to produce the finally molded product, the desired density and sizes or the like. Considering the above-described problems, temperatures of 80° C. to 160° C. are suitable for molding (compression molding) tablets from materials containing typical thermosetting resins. Producing tablets at a molding temperature at which the resin component partially melts with heat is particularly desirable because the resin becomes tacky and strongly binds the resin with the electric conductor, such as an expanded-graphite powder. In addition, tablets can be molded with lower pressure, so that thick tablets can be produced, and defects due to short shot can be prevented.

Tablets improved in strength and workability may be produced by allowing the resin to partially react (cure to B-stage) to such an extent that the full-molding is not hindered due to the poor flowability of the material, etc.

As to other conditions (compression conditions) of the tablet molding, the molding time is preferably 1 minute to 30 minutes, and the molding pressure is preferably 0.1 MPa to 3 MPa, more preferably 0.1 MPa to 2 MPa.

The shape of the tablet is not particularly limited, and is preferably a plate of 1 to 10 mm, more preferably 2 to 5 mm in thickness. The size of the plate depends on the size of the fuel-cell separator to be produced, and generally preferred is a rectangular or square plate with each side of 50 to 500 mm, preferably 100 to 300 mm.

The resultant tablet is then fully molded (thermal molding). The full-molding is an ordinary compression molding, and must be conducted at a higher temperature with a higher pressure than those for the tablet molding. For example, it may be performed by loading the tablet in a mold for fuel-cell separator molding heated to 150° C. to 200° C., preferably 160° C. to 190° C., and applying a pressure of 4 MPa to 30 MPa, preferably 6 MPa to 20 MPa. The time of the full-molding with heat and pressure is determined based on the reaction time of the resin at the molding temperature, and is generally 1 to 30 minutes, preferably 1 to 20 minutes, more preferably 5 to 15 minutes. After the full-molding, post cure may optionally be carried out by heating at about 180 to 250° C., preferably 200 to 250° C., for 20 to 240 minutes, preferably 30 to 240 minutes.

The shape of the fuel-cell separator of the invention is not particularly limited, and is preferably a ribbed plate. Particularly preferred is a fuel-cell separator wherein the ribs are in one body with the plate. In general, the optimum shapes of the ribs are designed considering the sectional area of each flow passage which affects the rate of gas supply, the contact area of ribs with electrodes which affects the electric conductance in the perpendicular direction, and the contact area of the electrodes with gases. Consequently, the height (A) of the ribs is preferably 0.3 mm or more, more preferably 0.6 mm or more, further preferably 0.6 mm to 3 mm, particularly preferably 0.6 mm to 1.5 mm. If it is less than 0.3 mm, the flow passage resistance is increased due to the narrow space between the electrodes and the plate part of the fuel-cell separator, and it may become difficult to stabilize the rate of gas supply. Ribs higher than 3 mm problematically increase the size of fuel cells.

Figure 2:
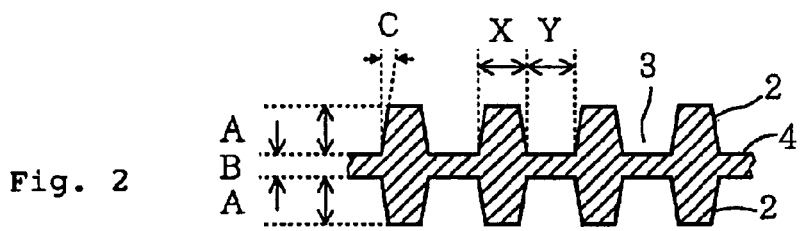
FIG. 2 is a sectional view of a fuel-cell separator of an embodiment according to the invention.
Figure 3:
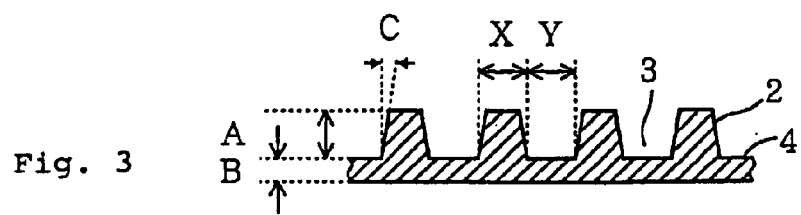
FIG. 3 is a sectional view of a fuel-cell separator of an embodiment according to the invention.

The ratio (A/B) of the height (A) of the ribs and the thickness (B) of the plate is preferably 0.5 or more, more preferably 0.5 to 5, particularly preferably 0.5 to 2.5 to produce smaller and lighter cells. If A/B is less than 0.5, the plate may be too thick to ensure a stable flow rate, and the electric conductivity in the direction of thickness may be reduced. If it is more than 5, the ribs are excessively high as compared with the thickness of the plate, and when a fuel cell is assembled, the fuel-cell separator may break due to lack of rigidity. The width (X) of the base of each rib is preferably 0.4 to 3 mm, more preferably 0.5 to 2.5 mm, further preferably 1.0 to 1.5 mm. The width (Y) of the base of each groove formed between adjacent ribs is preferably 0.4 to 3 mm, more preferably 0.5 to 2.5 mm, further preferably 1.0 to 1.5 mm. The ratio (X/Y) of (X) to (Y) is preferably 0.5 to 3.0, more preferably 0.8 to 1.5. FIG. 2 and FIG. 3 indicate the meanings of rib height (A), plate thickness (B), the width (X) of the base of each rib and the width (Y) of the base of each groove. FIG. 2 is a sectional view of a fuel-cell separator of an embodiment according to the invention which has ribs on both sides. Plural ribs 2 are formed on each side of plate 4 and adjacent ribs 2 form groove 3 between them. Ribs 2 on both sides extend in one direction.

FIG. 3 is a sectional view of a fuel-cell separator of another embodiment according to the invention which has ribs on one side. Plural ribs 2 are formed on one side of plate 4 to form grooves 3.

Figure 4:
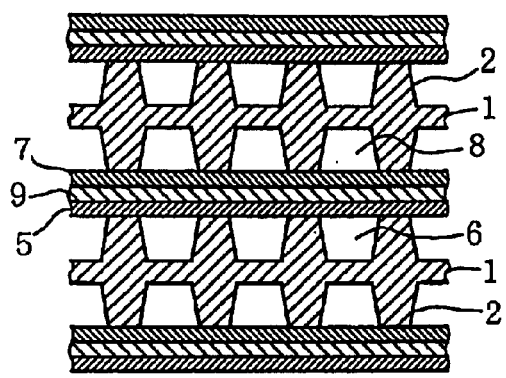
FIG. 4 is a partially sectional view of a fuel cell using a fuel-cell separator of an embodiment according to the invention.

FIG. 4 is a partially sectional view of a fuel cell wherein fuel-cell separators 1 each having ribs on both sides, electrolyte layers 9 and electrodes (5 and 7) are assembled. Fuel-cell separators 1 are placed so as to separate a fuel gas flowing on positive electrodes 5 from an oxidizer gas (air or oxygen) flowing on negative electrodes 7, and to form fuel gas passages 6 and oxidizer gas passages 8.

The ribs may be either both-sided ribs which are formed on both sides of a plate as shown in FIG. 2 or single-sided ribs which are formed on one side of a plate as shown in FIG. 3. Both-sided ribs need only one plate, and can downsize and lighten fuel-cell separators as compared with single-sided ribs.

The plate thickness (B) is preferably 0.25 mm to 2.0 mm, more preferably 0.25 mm to 1.5 mm, further preferably 0.25 to 1.0 mm. If it is less than 0.25 mm, the gas-sealability of the fuel-cell separator may be lowered. If it is more than 2.0 mm, the fuel-cell separator cannot be lightened and may have increased specific resistance.

The ribs are preferably tapered at an angle (C) of 2° to 30°, more preferably 2° to 20°. The meaning of the angle C is indicated in FIG. 2 and FIG. 3. If the angle of taper is less than 2°, monobloc-molded articles may become difficult to remove from molds, and an angle of more than 30° is undesirable for downsizing and lightening because the contact area with electrodes and the sectional area of each passage are reduced.

As an another embodiment, the invention provides a fuel-cell separator with excellent mechanical strength, which has a bending strength of 30 MPa or more, preferably 35 MPa or more, further preferably 40 MPa or more. Preferably, the fuel-cell separator also comprises a resin and an electric conductor dispersed in the resin.

The bending strength may be measured by the three-point method using an autograph (trade name: AG-5000B, produced by Shimazu Corp.). Measurements may be carried out at 23° C. by using a specimen of 20 mm wide and 1.5 mm thick under the conditions of 20 mm in span and 1 mm/1 minute in rate.

A method for giving the above-described bending strength is dispersing a fibrous material and an expanded-graphite powder in a resin. Not only excellent mechanical properties but also other required properties can be obtained by this method.

The preferred but non-limitative examples of usable fibrous materials are fibrous materials having electric conductivity, more preferably carbon fibers in view of mechanical strength and electric properties, particularly preferably carbon short fibers. Usable carbon short fibers include commercially available carbon short fibers, or carbon short fibers made from commercially available carbon fiber fabrics, braids or felts. Carbon short fibers impregnated with binders are also usable.

The carbon short fiber may be of any kind, and is preferably 3 $\mu$m to 20 $\mu$m in average diameter and 3 mm to 15 mm in average length. Short fibers of less than 3 $\mu$m in average diameter or less than 3 mm in average length are less effective in improving mechanical strength, and those of more than 20 $\mu$m in average diameter or more than 15 mm in average length may aggravate moldability.

Examples of the above-described short fibers are marketed under the trade names of S-231, S-232, S-233, S-234, S-331, S-332, S-333, S-334 (produced by Donac Co., Ltd.), and A-6000, A-9000 and S-3000 (produced by Asahi Chemical Carbon Fiber Co., Ltd.).

The ratio of the expanded-graphite powder to the fibrous material is preferably expanded-graphite powder/fibrous material=90/10 to 50/50 (weight ratio), more preferably 80/20 to 60/40. If the fibrous material is less than 10 parts by weight (more than 90/10 in the above-described weight ratio), improvement in mechanical strength may become difficult, and if it is more than 50 parts by weight (less than 50/50 in the above-described weight ratio), the moldability may be deteriorated.

The ratio of the sum total of the expanded-graphite powder and the fibrous material to the resin is preferably (sum total of expanded-graphite powder and fibrous material)/(resin)=85/15 to 55/45 (weight ratio). If the ratio of the sum total of the expanded-graphite powder and the fibrous material is more than 85/15, the mechanical strength may be lowered, and if less than 55/45, the electric conductivity may be reduced.

The fuel-cell separator of the invention is produced by using an electric conductor and a resin, and in the produced fuel-cell separator, the electric conductor is dispersed in a resin matrix.

In cases where an expanded-graphite powder, particularly one with an average particle diameter of 25 $\mu$m or more, preferably 50 $\mu$m or more, is used as the electric conductor, the expanded-graphite powder dispersed in the matrix resin lies in tangled fibrous rows. Such a state is desirable in the invention.

When the fuel-cell separator is produced by the above-described method of the invention, the dispersed electric conductor is oriented partially in the direction of the thickness of the fuel-cell separator (see FIG. 10) and partially in the direction perpendicular to the direction of the thickness of the fuel-cell separator (in various directions in a plane).

Figure 10:
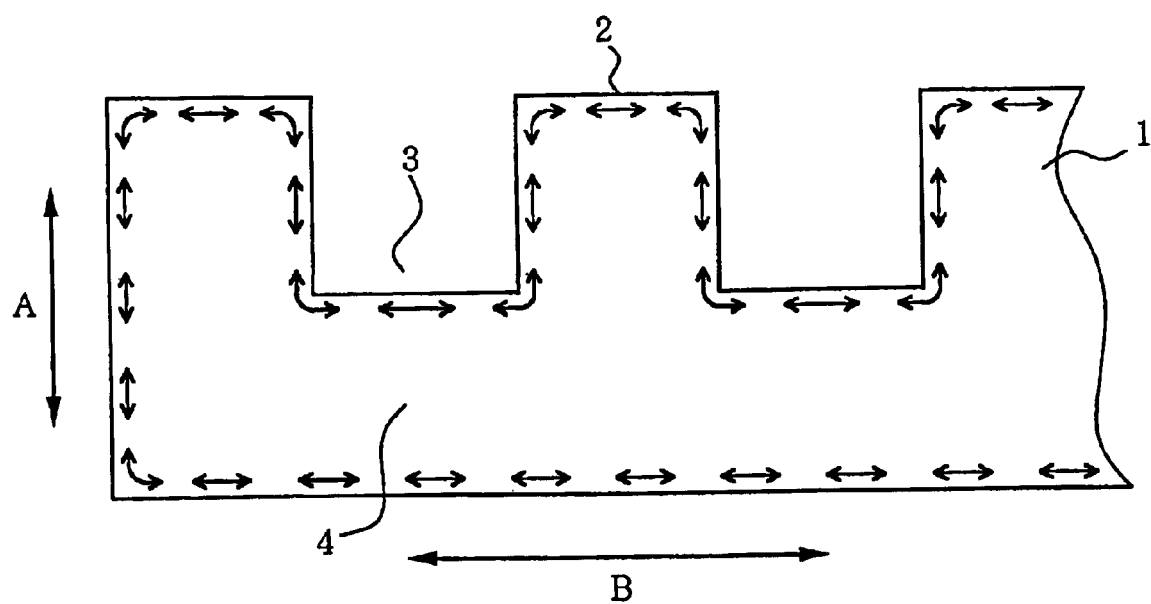
FIG. 10 is a schematic view showing the state of the electric conductor dispersed in a fuel-cell separator according to the invention.

Particularly, when an expanded-graphite powder of the above-described particle diameter and a powdery resin are monobloc-molded with heat and pressure by using a mold shaped for forming ribs (projections), a plate (planar parts) and optional other parts, the electric conductor dispersed in or near the surface of the molded fuel-cell separator is oriented along the surface. FIG. 10 shows an illustrative view of such a state. That is, the electric conductor is oriented in the directions of arrows as shown in FIG. 10. As FIG. 10 shows, near the side walls of ribs 2, the orientation is parallel to the wall faces and directed to the direction of the thickness of the fuel-cell separator. Arrow A indicates the direction of the thickness of the fuel-cell separator, and arrow B indicates the direction perpendicular to the direction of the thickness.

Figure 8A:
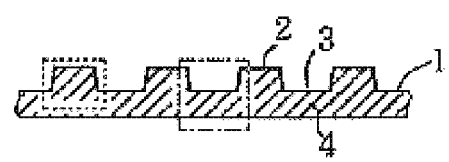
FIG. 8A is a sectional view of a fuel-cell separator of an embodiment according to the invention.
Figure 8B:
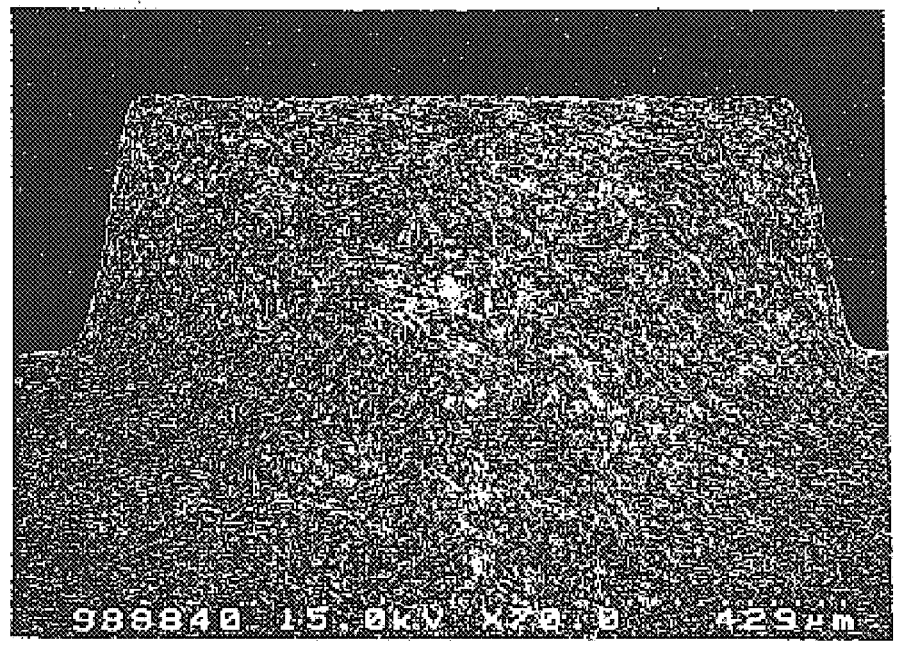
FIG. 8B is an electron micrograph of 70 magnification showing a cutting plane of the rib surrounded with the dotted line in FIG. 8A.
Figure 8C:
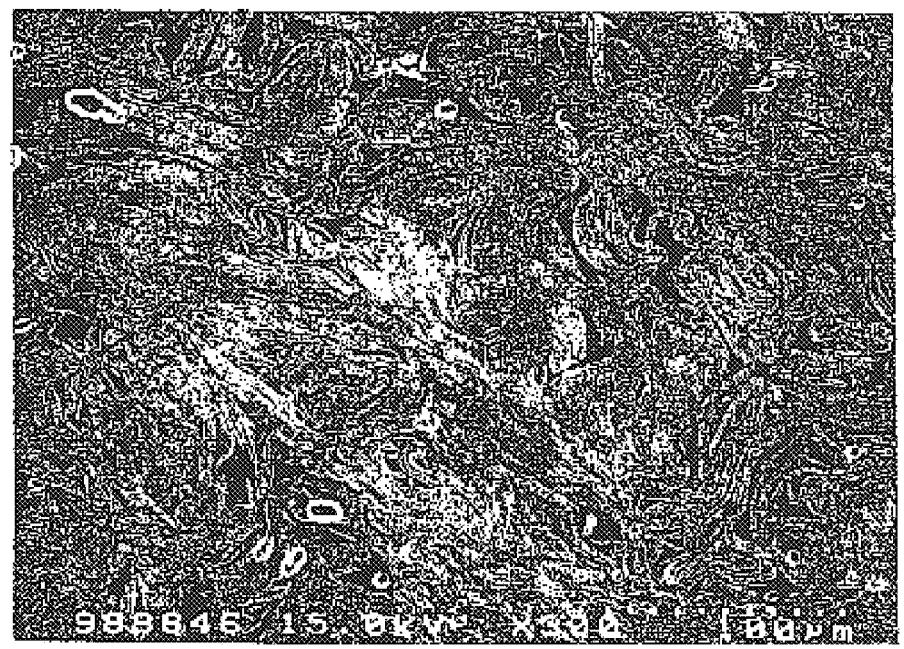
FIG. 8C is an electron micrograph of 300 magnification of the central part of the rib.
Figure 9A:
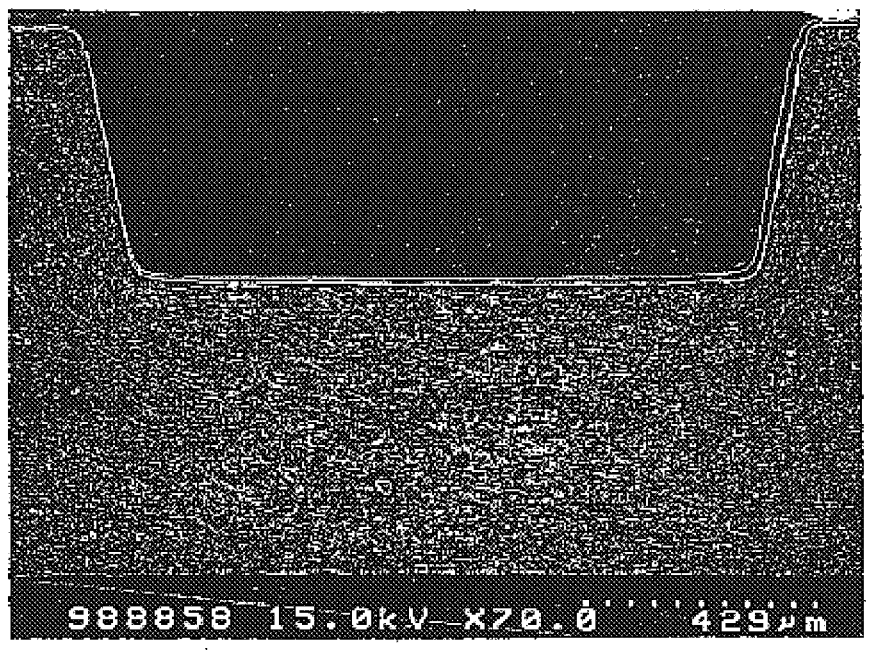
FIG. 9A is an electron micrograph of 70 magnification showing a cutting plane of a part of the fuel-cell separator of FIG. 8A under the groove surrounded with the dashed line.
Figure 9B:
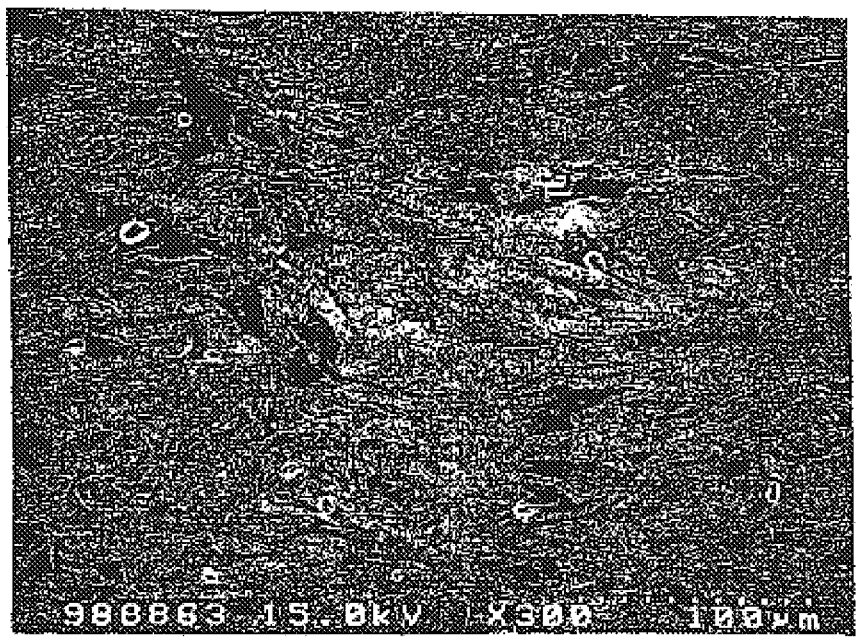
FIG. 9B is an electron micrograph of 300 magnification of the central part under the groove.

FIG. 8B, FIG. 8C, FIG. 9A and FIG. 9B are electron micrographs of an actual fuel-cell separator, which show the orientation as described above. FIG. 8B is an electron micrograph of 70 magnification showing a cutting-plane of the rib surrounded with the dotted line in FIG. 8A, and FIG. 8C is an electron micrograph of 300 magnification of the central part of the rib. FIG. 9A is an electron micrograph of 70 magnification showing a cutting plane of a part of the fuel-cell separator of FIG. 8A under the groove surrounded with the dashed line, and FIG. 9B is an electron micrograph of 300 magnification of the central part under the groove. The black areas are resin parts forming a matrix, and the gray parts are an expanded-graphite powder. Near the surface of the fuel-cell separator, the expanded-graphite powder lies in tangled fibrous rows and is oriented along the surface of the fuel-cell separator. As shown in FIG. 8C, in other parts, it lies in tangled fibrous rows but is not oriented.

Having such a structure, the fuel-cell separator of the invention has good electric conductivity, and there is no significant difference between the electric conductivities in the direction of thickness and the direction perpendicular to the direction of thickness. In cases where an expanded-graphite powder is used as an electric conductor, the concentration of residual sulfuric acid ions ($SO_4^{2-}$) in the fuel-cell separator of the invention is preferably 200 ppm or less, more preferably 0 to 150 ppm, further preferably 0 to 100 ppm, particularly preferably 0 to 50 ppm, extremely preferably 0 to 30 ppm. Residual sulfuric acid ion of more than 200 ppm may have adverse effects, such as deterioration in the electric properties of the fuel-cell separator or the corrosion of molds.

The sulfuric acid ion concentration may be determined by any method, for example, by pulverizing a part or all of a molded article, extracting soluble matters with ion-exchanged water (hot water) sufficiently, measuring the sulfuric acid ion concentration in the eluted solution with an ion-chromatograph measuring apparatus and calculating from the resulting value.

The method for attaining such a sulfuric acid ion concentration range is not particularly limited, and may be similar to the above-described method for reducing the sulfuric acid ion ($SO_4^{2-}$) concentration in an expanded-graphite powder to be used for thermal molding to 500 ppm or less. That is, an expanded-graphite powder is washed by agitating it for 10 to 30 minutes in water or hot water of 20 to 100 times the weight of the expanded-graphite powder. Drying may typically be performed at 50 to 150° C. under a degree of vacuum of 700 to 760 mmHg. The above-described heat treatment may also be used.

In case where a phenolic resin is used, the residual carbolic acid concentration in the fuel-cell separator of the invention is preferably 100 ppm or less, more preferably 0 to 50 ppm, further preferably 0 to 30 ppm. For example, if the carbolic acid concentration is more than 100 ppm, the resistance to water absorption may become poor, resulting in deterioration in electric properties, gas non-permeability and swelling with liquids.

The carbolic acid concentration may be determined by any method, for example, by pulverizing a part or all of a molded article, extracting soluble matters with hot water sufficiently, measuring the carbolic acid concentration in the eluted solution with a gas-chromatograph measuring apparatus and calculating from the resulting value.

In case where a phenolic resin is used, for example, the carbolic acid concentration can be adjusted to the above-described range by a heat treatment by raising the temperature during or after thermal molding to an extent that the concentration is decreased but the resin does not deteriorate. The temperature of the heat treatment is preferably 200° C. or higher, more preferably 200 to 300° C., and the treating time is preferably 30 minutes to 4 hours in view of the properties of the resulting molded article and economy. When the heat treatment is carried out at 200° C. or higher for 3 hours or more, it is preferably carried out in an atmosphere of nitrogen to prevent the oxidation deterioration of the phenolic resin. If the treating temperature is lower than 200° C., reducing the concentration to 100 ppm or less may require prolonged treatment and lower the productivity, and if it is higher than 300° C., the resin may be considerably deteriorated with heat, making it difficult to produce stable molded articles. If the treating time is less than 30 minutes, much carbolic acid may remain due to the inadequate transfer of heat toward the center, and if it is more than 4 hours, the phenolic resin may be deteriorated considerably.

The heat treatment is preferably carried out as a post cure step after the fuel-cell separator is thermally molded at a temperature lower than 200° C.

In case where the fuel-cell separator of the invention is produced by using an expanded-graphite powder and a phenolic resin, it is preferable that the residual sulfuric acid ion concentration is 200 ppm or lower and the carbolic acid concentration is 100 ppm or less to improve the properties relating to electric properties, gas non-permeability, swelling in liquids and durability.

The fuel-cell separator of the invention is applicable for various types of fuel cells, for example, the solid polymer type, the solid oxide type, the melt carbonate type, the aqueous alkaline solution type or the aqueous acid solution type, such as the phosphoric acid type.

Examples of electrolytes usable in the fuel cell are potassium hydroxide for the aqueous alkaline solution type, phosphoric acid for the aqueous acid solution type, an ion-exchanging film for the solid polymer type, lithium carbonate for the melt carbonate type, and a stabilized zirconia for the solid oxide type.

Examples of the base materials for the electrodes are carbon materials, such as carbon fibers with an optional surface layer of a catalyst, such as platinum, palladium, silver or nickel. Hydrogen to be used as a fuel gas is fed in a form of a decomposition product of water or a reformed gas rich with hydrogen made from various raw materials, such as natural gas, petroleum, coal or methanol, through optional reaction with water.

The fuel-cell separator of the invention is particularly suitable for solid polymer fuel cells.

When used in a fuel cell of the aqueous acid solution type such as the phosphoric acid type, the fuel-cell separator of the invention is exposed to a strongly acidic atmosphere and high temperatures. Therefore, if it contains a cured product of a common resin, it loses resisting reliability against acids and heat and deteriorates the electric properties of the fuel cell. Therefore, the above-described molded article containing an almost completely cured resin is preferably heat-treated in an inert gas of 200° C. or higher to carbonize the cured resin.

Non-limitative examples of furnaces usable for the heat treatment are batch furnaces and continuous furnaces. The time of the heat treatment is not particularly limited, and may determined according to the volume, heating rate and operative temperature range of the furnace and the number of the separators to be treated. It is generally preferable to heat at 200 to 2,000° C., more preferably 300 to 1,500° C., for 1 to 72 hours, more preferably 5 to 48 hours. An effective method of determining the optimum heat treatment conditions (temperature and time) is measuring the mechanical strength, electric properties and dimensions of the heat-treated molded article. An economically preferable but non-limitative example of the inert gas for the heat treatment is nitrogen gas.

A fuel cell generally comprises cell units each comprising an electrolyte layer, two electrode layers sandwiching the electrolyte layer as a fuel electrode and an air electrode, and two fuel-cell separators placed on the outer sides of the electrode layers.

Figure 5:
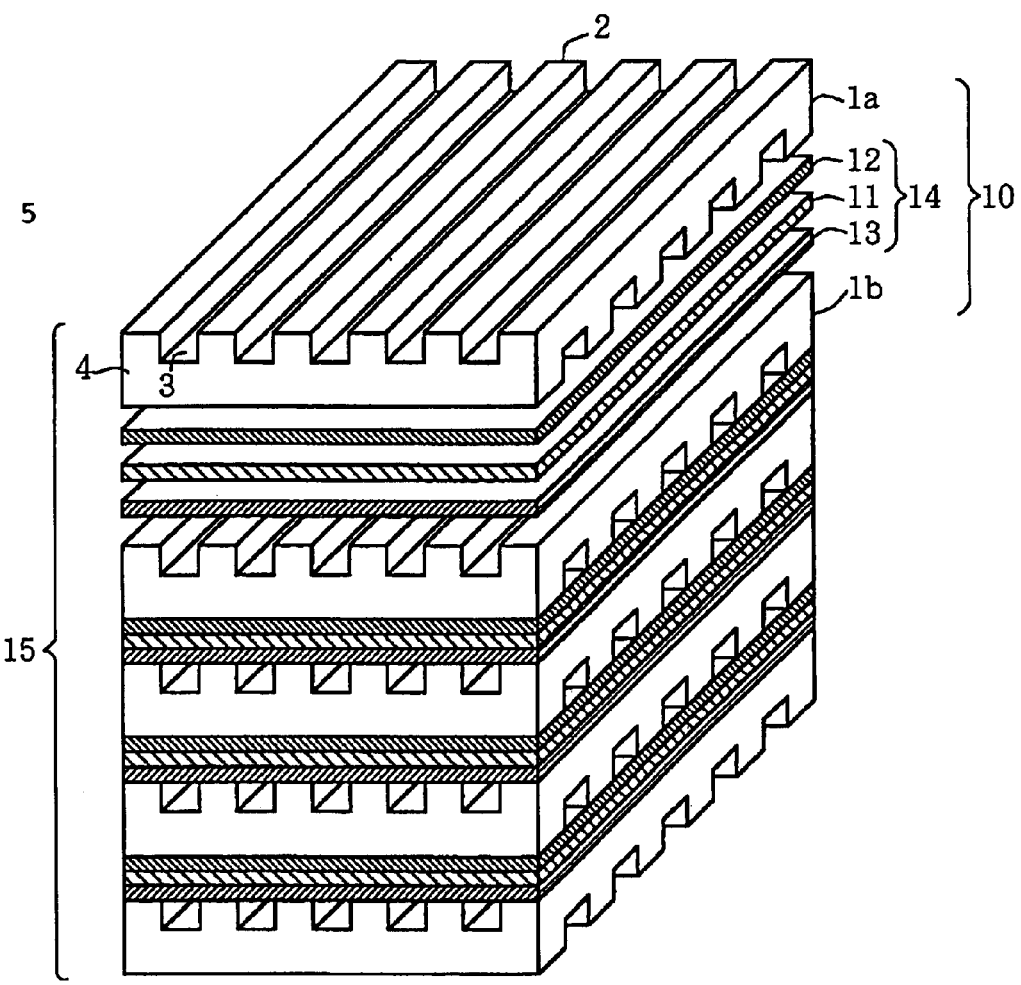
FIG. 5 is a perspective view of a fuel cell of an embodiment according to the invention.

FIG. 5 is a perspective view showing the cell structure of a solid polymer fuel cell of an embodiment.

Cell 10, which is the minimum unit reacting as a cell, comprises three-layer film 14 comprising solid polymer electrolyte film 11, fuel electrode 12 and air electrode 13, and fuel-cell separators 1a and 1b sandwiching three-layer film 14. Plural cells 10 of such a structure are stacked up as shown in FIG. 5 to form an assembly of cell stack 15.

EXAMPLES

The following is the description of the examples of the invention. Hereinafter, % means % by weight.

Example 1 and 2
(Examples Wherein Phenolic Resin Curable through Ring-opening-polymerization Is Used)

Example 1

(1) Production of Expanded-Graphite Powder 600 g of sulfuric acid (concentration: 99%) and 200 g of nitric acid (concentration: 99%) were placed in a 3-liter glass flask. Added thereto was 400 g of a graphite F48C (trade name, produced by Nippon Kokuen Co., Ltd., fixed carbon: 99% or more). After agitation for 5 minutes with an agitation motor (60 rpm) equipped with glass blades, 32 g of an aqueous hydrogen peroxide solution (concentration: 35%) was added, and agitation was resumed for 15 minutes. After the completion of the agitation, the resulting oxidized graphite was separated from the acid components by filtration under reduced pressure, transferred to another vessel and agitated for 10 minutes together with 5 liters of water added thereto. The washed, oxidized graphite was separated from the washing water by filtration under reduced pressure.

The washed, oxidized graphite was transferred to an enameled bat, leveled, and dried by removing water by heating for 1 hour in a drier heated to 110° C. It was then further heated for 5 minutes in a heating furnace heated to 800° C. to obtain an expanded-graphite. The expanded-graphite was rolled with rollers to obtain a sheet 0.7 mm thick and 1.0 g/cm$^3$ in density, which was pulverized with a coarse pulverizer (trade name: ROTOPLEX, produced by Hosokawa Micron Co., Ltd.) and then with a pulverizer (trade name: JIYUFUNSAIKI M-3, produced by Nara Kikal Seisakusho Co., Ltd.), to obtain an expanded-graphite powder of 150 $\mu$m in average particle diameter and 0.15 g/cm$^3$ in bulk density.

(2) Production of a Ring-Opening-Polymerizable Phenolic Resin (resin containing dihydrobenzoxazine rings)

Into a 5-liter flask were placed 1.9 kg of phenol, 1.0 kg of formalin (a 37% aqueous solution) and 4 g of oxalic acid, and were allowed to react for 6 hours under reflux. The internal pressure was then reduced to 6666.1 Pa (5 mmHg) or lower to remove unreacted phenol and water, to obtain a phenol novolak resin. The resin had a softening point of 84° C. (the ring and ball method) and a ratio of tri- and poly-nuclear fractions/di-nuclear fraction of 92/18 (a peak area ratio determined by gel permeation chromatography).

1.7 kg (corresponding to 16 mol of hydroxyl groups) of the phenol novolak resin was mixed with 0.93 kg (10 mol) of aniline and agitated for 5 hours at 80° C. to form a uniform solution mixture. Into a 5-liter flask was placed 1.62 kg of formalin and heated up to 90° C., and the novolak/aniline solution mixture obtained as above was added thereto gradually in 30 minutes. After the addition, the mixture was maintained at the reflux temperature for 30 minutes, and then the condensed water was removed at 100° C. for 2 hours under a reduced pressure of 6666.1 Pa (50 mmHg) or less, to obtain a resin containing dihydrobenzoxazine rings wherein 71 mol % of reactive hydroxyl groups had been converted into dihydrobenzoxazine (number average particle diameter: 20 $\mu$m, softening point: about 120° C., gelling time: 110 seconds (at 180° C., the hot plate method)). That is, the resin containing dihydrobenzoxazine rings contained the structures of general formula (A) and general formula (B) in a molar ratio of the former/the latter of 1/2.45.

The amount of the reactive hydroxyl groups in the phenol novolak resin was determined as follows.

1.7 kg of the phenol novolak resin (corresponding to 16 mol of hydroxyl groups) was allowed to react with 1.4 kg (corresponding to 16 mol) of aniline and 2.59 kg of formalin, to synthesize a resin wherein all reactive hydroxyl groups were converted into dihydrobenzoxazine rings. The yield after removal of the excessive aniline and formalin by drying was 3.34 kg. This indicates that 14 mol of reactive hydroxyl groups were contained in the phenol novolak resin and converted into dihydrobenzoxazine rings.

(3) Production of Fuel-Cell Separator 64 g of the expanded-graphite powder produced in Example 1(1) and 16 g of the powdery phenolic resin produced in (2) (ratio: 80/20) were placed in a plastic film bag. The bag was inflated with air, and dry blending was carried therein for 30 seconds.

The powder blend was evenly charged into a fuel-cell separator-molding mold heated to 180° C., and molded with a compression molding machine heated to the same temperature with a bearing pressure of 6 MPa for a molding time of 10 minutes (degassing: once), to produce a 140 mm long and 180 mm wide fuel-cell separator as shown in FIG. 1B which had a good appearance and ribs on one side (rib height A: 2 mm, plate thickness B: 0.5 mm, groove width Y: 1.0 mm, rib width X: 1.0 mm, rib taper: 5°). It was sandwiched between two 3 mm thick iron plates, placed in a drier heated to 200° C. and heated for 30 minutes.

Example 2

The procedure of Example 1(3) was repeated except that 50 g of the expanded-graphite powder produced in Example 1(1) and 50 g of the powdery phenolic resin produced in Example 1(2) were used, to produce a 140 mm long and 180 mm wide fuel-cell separator which had a good appearance and 2 mm high ribs on one side.

Evaluation

The appearances and internal states of the fuel-cell separators produced in Examples 1 and 2 were evaluated. Also the powder blends prepared in Examples 1 and 2 were molded under the same thermal molding conditions as those of their respective examples except that a plane-bottom mold was used, to produce 1.5 mm thick plates for evaluations of bending strengths and specific resistances. The results are given in Table 1.

TABLE 1

|  | Example 1 | Example 2 |
|---|---|---|
| Appearance | Good | Good |
| Internal state | Good | Good |
| Bending strength (MPa) | 45 | 60 |
| Specific resistance ($\mu\Omega \cdot$ m) | 30 | 95 |

Appearance and internal state: visual inspection

Bending strength: 20 mm wide and 1.5 mm thick specimens were tested by using an autograph (AG-5000B produced by Shimazu Corp.) adjusted to 20 mm in span and 1 mm/1 min in rate, and then bending strengths were calculated.

Specific resistance: According to JIS R 7202; the voltage drop method (in a direction in a face)

Examples 3 to 6
(Investigation of the Particle Diameter of Expanded-graphite Powder)

Example 3

(1) Production of Expanded-Graphite Powder

The procedure of Example 1(1) was repeated to obtain 90 g of an expanded-graphite powder of 150 µm in average particle diameter.

(2) Production of Fuel-Cell Separator 56 g of the expanded-graphite powder produced in Example 3(1) and 24 g of a resol phenolic resin powder (trade name: TD2040C, produced by Dainippon Ink & Chemical, Inc., number average particle diameter: 30 µm, softening point: about 110° C., gelling time: 100 seconds (180° C., the hot plate method) (ratio: 70/30) were placed in a plastic film bag. The bag was inflated with air, and dry blending was carried out therein for 30 seconds.

The powder blend was uniformly charged into a fuel-cell separator-molding mold heated to 180° C., and molded with a compression molding machine heated to the same temperature with a bearing pressure of 6 MPa for a molding time of 10 minutes (degassing: three times), to produce a 140 mm long and 180 mm wide fuel-cell separator as shown in FIG. 1(b) which had a good appearance and ribs on one side (rib height A: 2 mm, plate thickness B: 0.5 mm, groove width Y: 1 mm, rib width X: 1 mm, rib taper: 5°). It was sandwiched between two 3 mm thick iron plates, placed in a drier heated to 200° C. and heated for 30 minutes.

Example 4

(1) Production of Expanded-Graphite Powder

A part of the expanded-graphite sheet produced in Example 3(1) was pulverized with the same pulverizers to an average particle diameter of 250 µm, to produce 90 g of an expanded-graphite powder (bulk density: 0.12 g/cm$^3$).

(2) Production of Fuel-Cell Separator

A fuel-cell separator having a good appearance and rib-shaped projections was produced with the same composition and in the same manner as in Example 3 except that 56 g of the expanded-graphite powder produced in Example 4(1) was used.

Example 5

(1) Production of Expanded-Graphite Powder

A part of the expanded-graphite sheet produced in Example 3(1) was ground with the same pulverizers to an average particle diameter of 400 µm, to produce 90 g of an expanded-graphite powder (bulk density: 0.10 g/cm$^3$).

(2) Production of a Fuel-cell Separator

A fuel-cell separator having a good appearance and rib-shaped projections was produced with the same composition and in the same manner as in Example 3 except that 56 g of the expanded-graphite powder produced in Example 5(1) was used.

Example 6
(for Graphite Powder with an Average Particle Size of Less than 50 µm)

(1) Production of Expanded-Graphite Powder

A part of the expanded-graphite sheet produced in Example 3(1) was ground with the same pulverizers to an average particle diameter of 10 µm, to produce 90 g of an expanded-graphite powder (bulk density: 0.5 g/cm$^3$).

(2) Production of Fuel-Cell Separator

A fuel-cell separator having a good appearance and rib-shaped projections was produced with the same composition and in the same manner as in Example 3 except that 56 g of the expanded-graphite powder produced in Example 6(1) was used.

The appearances of the fuel-cell separators produced in Examples 3 to 6 were evaluated. Also the powder blends prepared in Examples 3 to 6 were molded under the same thermal molding conditions as those of respective examples except that a plane-bottom mold was used, to produce 1.5 mm thick plates for evaluations of bending strengths and specific resistances. The results are given in Table 2.

TABLE 2

| | Example Nos. | | | |
|---|---|---|---|---|
| | 3 | 4 | 5 | 6 |
| Appearance of fuel-cell separator | Good | Good | Good | Good |
| Bending strength (MPa) | 47 | 52 | 59 | 25.3 |
| Specific resistance (µΩ · m) | 36 | 30 | 29 | 54 |

Appearance: visual inspection

Bending strength: A 20 mm wide and 1.5 mm thick specimen was tested by using an autograph (AG-5000B produced by Shimazu Corp.) adjusted to 20 mm in span and 1 mm/1 min in rate, and the bending strength was calculated.

Specific resistance: According to the voltage drop method (in a direction in a face).

The fuel-cell separators obtained as above were cut in a direction of thickness. When the sections were observed in their 70–500 magnification electron micrographs, the expanded-graphites of Examples 3 to 5 were dispersed in the forms of entangled fibers, making it difficult to distinguish particles. Therefore, from the fibers forming a mass to a certain degree, 20 particles were randomly extinguished and extracted to measure the particle diameters. In any of Examples 3 to 6, the average value calculated from the particle diameters was 1 to 2 times the value determined before mixing.

Examples 7 to 9
(Investigation of Density of Expanded-graphite)

Example 7

(1) Production of Expanded-Graphite Powder 600 g of sulfuric acid (concentration: 99%) and 200 g of nitric acid (concentration: 99%) were placed in a 3-liter glass beaker. Added thereto was 400 g of a graphite F48C (trade name, produced by Nippon Kokuen Co., Ltd., fixed carbon number: 99% or more). After agitation for 5 minutes with an agitation motor (60 rpm) equipped with glass blades, 32 g of an aqueous hydrogen peroxide solution (concentration: 35%) was added, and agitation was resumed for 15 minutes. After the completion of the agitation, the resulting oxidized graphite was separated from the acid components by filtration under reduced pressure, transferred to another vessel, agitated for 10 minutes together with 5 liters of water added thereto, and separated from the washing water by filtration under reduced pressure.

The washed, oxidized graphite was transferred into an enameled bat, leveled, and heated for 1 hour in a drier heated to 110° C. to remove water. It was then further heated for 5 minutes in a heating furnace heated to 800° C. to obtain an expanded-graphite. The expanded-graphite had a density of 0.01 g/cm$^3$.

A part of the expanded-graphite was rolled using rollers to obtain a sheet of 0.8 g/cm$^3$ in density, which was then pulverized with a coarse pulverizer (trade name: ROTOPLEX, produced by Hosokawa Micron Co., Ltd.) and then with a pulverizer (trade name: JIYUFUNSAIKI M-3, produced by Nara Kikai Seisakusho Co., Ltd.), to obtain 90 g of an expanded-graphite powder of 0.15 g/cm$^3$ in bulk density and 150 μm in average particle diameter.

(2) Production of Fuel-Cell Separator 56 g of the expanded-graphite powder produced in Example 7(1) and 24 g of a resol phenolic resin powder (trade name: TD2040C, produced by Dainippon Ink & Chemicals, Inc.) (ratio: 70/30) were placed in a plastic film bag. The bag was inflated with air, and dry blending was carried therein for 30 seconds.

The powder blend was evenly charged into a fuel-cell separator-molding mold heated to 180° C., and molded with a compression molding machine heated to the same temperature with a bearing pressure of 6 MPa for a molding time of 10 minutes (degassing: three times), to produce a 140 mm long and 180 mm wide fuel-cell separator having a good appearance and ribs on one side (rib height A: 2 mm, plate thickness B: 1.5 mm, groove width Y: 1.0 mm, rib width X: 1.0 mm, rib taper: 5°). It was sandwiched between two 3 mm thick iron plates, placed in a drier heated to 200° C. and heated for 30 minutes.

Example 8

(1) Production of Expanded-Graphite Powder

The expanded-graphite obtained in Example 7(1) was rolled with rollers to form an expanded-graphite sheet of 1.2 g/cm$^3$ in density, which was then pulverized in the same manner as in Example 7(1) to obtain 90 g of an expanded-graphite powder of 0.14 g/cm$^3$ in bulk density and 150 μm in average particle diameter.

(2) Production of Fuel-Cell Separator

A fuel-cell separator was produced by carrying out production of a powder blend, molding and heat treatment in the same manner as in Example 7(2) except that the expanded-graphite powder obtained as above was used.

Example 9

(1) Production of Expanded-Graphite Powder

The expanded-graphite obtained in Example 7(1) was rolled with rollers to form a sheet of 1.8 g/cm$^3$ in density, which was then pulverized in the same manner as in Example 7(1) to obtain 90 g of an expanded-graphite powder of 0.2 g/cm$^3$ in bulk density and 100 μm in average particle diameter.

(2) Production of Fuel-Cell Separator

A fuel-cell separator was produced by carrying out production of a powder blend, molding and heat treatment in the same manner as in Example 7(2) except that the expanded-graphite powder as obtained above was used.

The appearances of the fuel-cell separators produced in Examples 7 to 9 were observed, and 1.5 mm thick plates were produced by grinding off the ribs of the fuel-cell separators, to measure their bending strengths and specific resistances. The results are as shown in Table 3.

TABLE 3

|  | Example Nos. | | |
| --- | --- | --- | --- |
|  | 7 | 8 | 9 |
| Appearance of fuel-cell separator | Good | Good | Good |
| Bending strength (MPa) | 52 | 48 | 45 |
| Specific resistance (μΩ · m) | 32 | 37 | 55 |

Appearance: visual inspection

Bending strength: A 20 mm wide and 1.5 mm thick specimen was tested by using an autograph (AG-5000B produced by Shimazu Corp.) adjusted to 20 mm in span and 1 mm/1 min in rate, and the bending strength was calculated.

Specific resistance: According to the voltage drop method (in a direction in a face).

Examples 10 to 14
(Investigation of Monobloc-molding)

Example 10

An expanded-graphite sheet of 1.0 mm thick and 1.0 g/cm$^3$ density (trade name: CARBOFIT HGP-105, produced by Hitachi Chemical Co., Ltd.) was pulverized with a coarse pulverizer and a pulverizer, to obtain 700 g of a pulverized expanded-graphite powder of 100 μm in average particle diameter (bulk density: 0.18 g/cm$^3$). 300 g of a resol phenolic resin powder (trade name: TD2040C, produced by Dainippon Ink & Chemicals, Inc.) was added thereto and dry-blended with a small V-blender, to obtain 1,000 g of a powder mixture.

In order to mold a 100 mm×100 mm fuel-cell separator which has single-sided equal-pitch ribs and is 2.5 mm in rib height (A), 0.5 mm in plate thickness (B), 2 mm in groove width (Y), 2 mm in the rib width (X) and 10° in rib taper (C), a mold given a transferred shape of the fuel-cell separator was heated to 180° C., and 20 g of the above-mentioned powder mixture as described above was charged evenly in the mold in a basis weight of 2,000 g/m$^2$. It was then compression molded with a thermal press of 180° C. under the conditions of a bearing pressure of 6 MPa, a molding time of 10 minutes and three degassings, to obtain a fuel-cell separator of 1.4 g/cm$^3$ in density with the prescribed rib-shape.

Example 11

(1) Production of Ring-Opening-Polymerizable Phenolic Resin (resin containing dihydrobenzoxazine rings)

The procedure of Example 1(2) was repeated to obtain a dihydrobenzoxazine ring-containing resin (number average particle diameter: 20 μm, softening point: about 120° C., gelling time: 110 seconds (180° C., the hot plate method)) wherein 71 mol % of reactive hydroxyl groups had been converted into dihydrobenzoxazine.

(2) Production of Fuel-Cell Separator

An expanded-graphite sheet of 1.0 mm thick and 1.0 g/cm$^3$ density (trade name: CARBOFIT HGP-105, produced by Hitachi Chemical Co., Ltd.) was ground with a coarse pulverizer and a pulverizer, to obtain 700 g of a pulverized expanded-graphite powder of 100 μm in average particle diameter (bulk density: 0.19 g/cm$^3$). 300 g of the phenolic resin powder produced as above was added thereto and dry-blended with a small V-blender, to obtain 1,000 g of a powder mixture.

In order to mold a 100 mm×100 mm fuel-cell separator which has single-sided equal-pitch ribs and is 1.0 mm in rib height (A), 0.5 mm in plate thickness (B), 2 mm in groove width (Y), 2 mm in rib width (X) and 10° in rib taper (C), a mold given a transferred shape of the fuel-cell separator was heated to 180° C., and 20 g of the above-mentioned powder mixture was charged evenly in the mold in a basis weight of 2,000 g/m$^2$. It was then compression molded with a thermal press of 180° C. under the conditions of a bearing pressure of 6 MPa, a molding time of 10 minutes and one degassing, to obtain a fuel-cell separator of 1.4 g/cm$^3$ in density with the prescribed rib-shape.

Example 12

In order to mold a 100 mm×100 mm fuel-cell separator which has equal-pitch ribs and is 0.5 mm in rib height (A), 0.25 mm in plate thickness (B), 0.4 mm in groove width (Y), 0.4 mm in rib width (X) and 29° in rib taper (C), a mold given a transferred shape of the fuel-cell separator was heated to 180° C., and 4.43 g of the powder mixture obtained in Example 11(2) was charged evenly in the mold in a basis weight of 2,000 g/m$^2$. It was then compression molded with a thermal press of 180° C. under the conditions of a bearing pressure of 6 MPa, a molding time of 10 minutes and one degassing, to obtain a fuel-cell separator of 1.4 g/cm$^3$ in density with the prescribed rib-shape.

Example 13
(for Comparison)

14 g of the expanded-graphite (average particle diameter: 100 μm, bulk density: 0.19 g/cm$^3$) that was used in Example 11 but was not yet shaped into a sheet was charged evenly in the mold used in Example 1, molded at room temperature under the molding conditions of a bearing pressure of 6 MPa and three degassings, to obtain a 1.4 g/cm$^3$ density fuel-cell separator made of only expanded-graphite (rib height A: 1.0 mm, plate thickness B: 0.5 mm, groove width Y: 2 mm, rib width X: 2 mm, rib taper: 10°).

Example 14
(for Comparison)

The fuel-cell separator obtained in Example 13 was dipped for 12 hours in a melamine-modified phenolic resin (trade name: PR-4060, produced by Hitachi Chemical Co., Ltd., liquid, solvent: water/isopropanol=50/50 (weight ratio), solid content (resin content): 50 wt %, number average molecular weight: 450, gelling time: 60 seconds (160° C., the hot plate method)), dried for 30 minutes in a vacuum dryer heated to 40° C. to remove the solvents. It was then cured by heating it from 25° C. up to 160° C., to obtain a fuel-cell separator with a resin impregnation percentage of 30 wt % and a density of 1.3 g/cm$^3$.

The fuel-cell separators produced in Examples 10 to 14 were examined for specific resistance, gas permeability and swelling with liquids. To measure specific resistance, in addition to the real fuel-cell separators, 50 mm×50 mm×12 mm thick samples of the same densities were compression molded, and their specific resistances in the direction of thickness were measured by the voltage drop method. Determinations of gas permeability were carried out by sealing the peripheries of the fuel-cell separators with a silicone rubber, applying an air pressure of 1 g/cm$^2$ to one side to measure the amounts Q of air leakage by the underwater substitution method, and calculating using the following formula.

Gas permeability=$Q/T \times D/S$ wherein T is the pressurizing time (second), D is the thickness (mm) of a test specimen, and S is the pressurized area (cm$^2$). Swelling with liquids was evaluated with the percentage of the increase in thickness of a fuel-cell separator caused by dipping in a hot water of 90° C. for 24 hours. Table 4 gives the examination results of the appearance and properties of the fuel-cell separators.

TABLE 4

|  | Example 10 | Example 11 | Example 12 | Example 13 | Example 14 |
|---|---|---|---|---|---|
| Moldability (appearance) | normal | normal | normal | rib top was broken | rib top was broken |
| Specific resistance (μΩ · m) | 42 | 36 | 34 | 75 | 83 |
| Gas permeability (cm$^2$/sec) | ≤10$^{-5}$ | ≤10$^{-5}$ | ≤10$^{-5}$ | ≤10$^{-3}$ | ≤10$^{-1}$ |
| Swelling with liquids (%) | 0.3 | 0.3 | 0.3 | 5 | 1 |

As apparent from Examples 10 to 14, when produced by monobloc-molding a mixture of an expanded-graphite powder and a thermosetting or thermoplastic resin with heat and pressure, the ribbed, fuel-cell separator can have an ideal shape which satisfies downsizing and lightening required of fuel cells, that is a shape of down to 0.3 mm, preferably down to 0.6 mm in rib height, 0.25 to 1.0 mm in plate thickness and 0.5 to 5 in the ratio of rib height (A) to plate thickness (B). The fuel-cell separator thus obtained exhibits excellent characteristics in electric conductivity, gas permeability and swelling with liquids, and maintains stable characteristics as a fuel-cell separator during long-term use.

Examples 15 to 19
(Investigation of Sulfuric Acid Ion Concentration of Expanded-Graphite Powder)

Example 15

(1) Production of Expanded-Graphite Powder

The procedure of Example 1(1) was repeated to obtain 90 g of an expanded-graphite powder of 150 μm in average particle diameter and 1.0 g/cm$^3$ in density.

(2) Production of Expanded-Graphite Powder with decreased Residual Sulfuric Acid Ions Into 1-liter glass beaker was placed 20 g of the expanded-graphite powder produced in Example 15(1), and 600g of water of room temperature (20° C.) was added thereto and agitated with a glass rod for 30 seconds to mix the expanded-graphite powder with water, and then agitated with an agitator for 10 minutes.

After completion of the stirring, filtration under reduced pressure was carried out on a filter paper set on a funnel, to obtain a washed expanded-graphite powder. The washed expanded-graphite powder was transferred to an enameled bat, leveled, and dried for 1 hour under a vacuum of 730 mmHg in a vacuum drier heated to 200° C., to obtain an expanded-graphite powder which contained decreased sulfuric acid ions and had an average particle diameter of 150 μm and a bulk density of 0.16 g/cm$^3$.

Example 16

The procedure of Example 15 was repeated except that the water of 20° C. was replaced by a hot water of 60° C., to obtain an expanded-graphite powder which contained decreased sulfuric acid ions and had an average particle diameter of 150 μm and a bulk density of 0.15 g/cm$^3$.

Example 17

An expanded-graphite powder was produced and shaped into a sheet in the same manner as in Example 15. 40 g of the sheet was heated for 8 hours at 600° C. in a laboratory furnace of nitrogen atmosphere, cooled and pulverized with the same pulverizers as those used in Example 15, to obtain an expanded-graphite powder which contained decreased sulfuric acid ions and had an average particle diameter of 150 μm and a bulk density of 0.18 g/cm$^3$.

Example 18

An expanded-graphite powder was produced and shaped into a sheet in the same manner as in Example 15, and pulverized, with the same pulverizers as those used in Example 15 into an expanded-graphite powder. 40 g of the expanded-graphite powder was heated for 8 hours at 600° C. in a laboratory furnace of nitrogen atmosphere, to obtain an expanded-graphite powder which contained decreased sulfuric acid tons and had an average particle diameter of 150 μm and a bulk density of 0.18 g/cm$^3$.

Example 19
(Example with High Sulfuric Acid Ion Concentration)

The expanded-graphite powder produced in Example 15(1) was used as it was without washing with water.
Evaluation The sulfuric acid ion concentrations in the expanded-graphite powders produced in Examples 15–19 were determined to investigate the effects of washing and vacuum drying. The results are given in Table 5.

TABLE 5

|  | Example 15 | Example 16 | Example 17 | Example 18 | Example 19 |
|---|---|---|---|---|---|
| Sulfuric acid ion concentration (ppm) | 185 | 120 | 153 | 145 | 523 |

Determination of the amount of sulfuric acid ions:

1 g of an expanded-graphite powder and 15 g of pure water were placed in a Teflon-pressure vessel, and after extraction with hot water for 8 hours at 100° C., filtration was carried out, and the filtrate was used as a sample.

The measuring apparatus used was ION CHROMATOGRAPH IC-7000 (produced by Yokokawa Denki Co., Ltd.).

(3) Production of Ring-Opening-Polymerizable Phenolic Resin (resin containing dihydrobenzoxazine ring)

A resin was produced in the same manner as in Example 1(2). The resin was pulverized with a pulverizer to obtain a powdery phenolic resin (number average particle diameter: 20 μm, softening point: about 120° C., gelling time: 110 seconds (180° C., the hot plate method) which generates little gases on reaction.

(4) Production of Fuel-Cell Separator 64 g of each of the expanded-graphite powders produced in Examples 15–19 and 16 g of the ring-opening-polymerizable phenolic resin were placed in a plastic film bag. The bag was inflated with air, and dry blending was carried therein for about one minute.

Each powder mixture was evenly charged into a fuel-cell separator-molding mold heated to 180° C., and molded for 10 minutes with a molding temperature of 180° C. and a molding pressure (bearing pressure) of 8 MPa, to produce a 140 mm long and 180 mm wide fuel-cell separator having ribs on one side (rib height A: 2 mm, plate thickness B: 0.5 mm, groove width Y: 2.0 mm, rib width X: 2.0 mm, rib taper: 10°).

Each fuel-cell separator was then sandwiched between two 3 mm thick iron plates, placed in a drier heated to 200° C., and heated for 60 minutes.

After molding, the moldability of the molded articles and the discoloration of the molds were evaluated and are listed in Table 6.

As to the evaluation of moldability, ○ means a molded article which was free of vacant parts and was a complete copy of the mold, and X means that the powder mixture was cured during molding, failing to form a completely molded article.

TABLE 6

|  | Example 15 | Example 16 | Example 17 | Example 18 | Example 19 |
|---|---|---|---|---|---|
| Moldability of fuel-cell separator | ○ | ○ | ○ | ○ | X |
| Discoloration of mold | No | No | No | No | Partially whitened |

Examples 20 to 25
(Investigation of Pre-molding)

Example 20

(1) Production of Expanded-Graphite Powder 600 g of sulfuric acid (concentration: 99 wt %) and 200 g of nitric acid (concentration: 99 wt %) were placed in a 3-liter glass flask. Added thereto was 400 g of a graphite F48C (trade name, produced by Nippon Kokuen Co., Ltd., fixed carbon: 99 wt % or more). After agitation for 6 minutes with an agitation motor (60 rpm) equipped with glass blades, 32 g of an aqueous hydrogen peroxide solution (concentration: 35 wt %) was added, and agitation was resumed for 15 minutes. After the completion of the agitation, the resulting oxidized graphite was separated from the acid components by filtration under reduced pressure, transferred to another vessel and agitated for 10 minutes together with 5 liters of water added thereto. The washed, oxidized graphite was separated from the washing water by filtration under reduced pressure.

The washed, oxidized graphite was transferred into an enameled bat, leveled, and heated for 1 hour in a drier heated to 120° C. to remove water. It was then further heated for 5 minutes in a heating furnace heated to 850° C. to obtain an expanded-graphite of 0.015 g/cm$^3$ in density. The expanded-graphite was rolled using rollers to obtain a sheet of 1.0 g/cm$^3$ in density, which was pulverized with a coarse pulverizer (trade name: ROTOPLEX, produced by Hosokawa Micron Co., Ltd.) and then with a pulverizer (trade name: JIYUFUNSAIKI M-3, produced by Nara Kikai Seisakusho Co., Ltd.), to obtain an expanded-graphite powder of 130 μm in average particle diameter (bulk density: 0.16 g/cm$^3$).

(2) Production of Ring-Opening-Polymerizable Phenolic Resin (resin containing dihydrobenzoxazine rings)

A phenolic resin was produced in the same manner as in Example 1(2).

(3) Production of Molded Article 105 g of the expanded-graphite powder produced in (1) and 45 g of the powdery phenolic resin produced in (2) (expanded-graphite powder/resin=70/30) were placed in a plastic film bag. The bag was inflated with air, and dry blending was carried therein for about one minute.

75 g of the powder mixture was charged into a 578 cm$^3$ capacity female mold of room temperature. After a male mold was set, molding was carried out for one minute with a bearing pressure of 1 MPa by using a 76-ton press which had not yet been heated, and into the vacancy formed in the female mold was further charged 75 g of the remaining powder mixture, and molded under the same conditions as above, to produce a pre-molded cubic article which was to be further molded into a molded article for measurement of electric resistance.

After the production of the pre-molded article, the female mold was put on a press hot plate, and heating was started to heat the hot plate to 180° C. When the temperature of the mold was reached 180° C. 70 minutes after the beginning of heating, the mold was removed and loaded evenly with the pre-molded article. Subsequently the mold was returned on the press and allowed stand for 1 minute without applying pressure, and thermal molding was then carried out with a bearing pressure of 6 MPa for 15 minutes. The resulting molded article was heated one hour at 200° C. (post cure), to obtain a molded article of a good appearance having a compressed area of 77 cm$^2$ (one side) and a thickness of 18 mm.

Example 21

A molded article of a good appearance having a compressed area of 77 cm$^2$ (one side) and a thickness of 18 mm was produced by carrying out pre-molding, thermal molding and post cure in the same manner as in Example 20(3) except that 120 g of the expanded-graphite powder produced in Example 20(1) and 30 g of the powdery phenolic resin produced in Example 20(2) (expanded-graphite powder/resin=80/20) were used.

Example 22

A molded article of a good appearance having a compressed area of 77 cm$^2$ (one side) and a thickness of 18 mm was produced by carrying out pre-molding, thermal molding and post cure in the same manner as in Example 20(3) except that 135 g of the expanded-graphite powder produced in Example 20(1) and 15 g of the powdery phenolic resin produced in Example 20(2) (expanded-graphite powder/resin=90/10) were used.

Example 23
(Pre-molding Was Not Carried Out)

The powder mixture obtained in Example 20(3) was not pre-molded but directly charged into a female mold heated to 180° C. by pressing with a metal spoon, and then thermal molding and post cure were carried out under the same conditions as those of Example 20(3), to obtain a molded article of the same dimensions having a good appearance.

Example 24
(Pre-molding Was Not Carried Out)

A powder mixture prepared by mixing the expanded-graphite powder and the powdery phenolic resin in the same amounts as in Example 22 was not pre-molded but directly charged into a female mold heated to 180° C. by pressing with a metal spoon, and then thermal molding and post cure were carried out under the same conditions as those of Example 20(3), to obtain a molded article of the same dimensions having a good appearance.

Evaluation

The appearances, electric resistances and bending strengths of the molded articles produced in Examples 20 to 24 were evaluated. 20 mm wide and 1.5 mm thick specimens cut out from the molded articles were used to measure their bending strengths. The results are listed in Table 7.

TABLE 7

|  | Example 20 | Example 21 | Example 22 | Example 23 | Example 24 |
| --- | --- | --- | --- | --- | --- |
| Appearance | Good | Good | Good | Good | Good |
| Specific resistance ($\mu\Omega \cdot m$) | 30 | 27 | 25 | 35 | 30 |
| Bending strength (MPa) | 45 | 41 | 33 | 39 | 29 |

* Appearance: visual observation

Specific resistance: Measurements were carried out by the voltage drop method in the direction of thickness (compressing direction) by using 18 mm thick and 15 mm wide blocks as specimens.

Bending strength: Specimens 20 mm wide and 1.5 mm thick were tested (23° C.) at a rate of 1 mm/min with an autograph (trade name: AG-5000B, produced by Shimazu Seisakusho Co., Ltd.) adjusted to 20 mm in span, and their bending strengths were calculated.

(4) Production of Fuel-Cell Separator

The molded articles of Examples 20 to 22 were machined by cutting them into fuel-cell separators with equally pitched ribs of 2.5 mm in rib height, 0.5 mm in plate thickness, 2 mm in groove width, 2 mm in rib width and 10° in rib taper. The fuel-cell separators had good appearances.

Example 25

Into a mold for molding a fuel-cell separator (one-side ribbed) with equally pitched ribs of 2.5 mm in rib height (A), 0.5 mm in plate thickness (B), 2 mm in groove width (Y), 2 mm in rib width (X) and 10° in rib taper (C) was charged evenly 20 g of a powder mixture (expanded-graphite powder/resin=70/30) comprising the expanded-graphite powder produced in Example 20(1) and the powdery phenolic resin produced in Example 20(2), and pre-molded with a 76-ton press for 1 minute at room temperature (about 20° C.) with a bearing pressure of 2 MPa, to obtain a pre-molded article.

After the pre-molded article was removed from the mold, the mold was heated up to 180° C. on a press hot plate, and the pre-molded article was returned into the heated mold and molded with a bearing pressure of 6 MPa for 10 minutes. The resulting molded article was sandwiched between two metal plates and heated at 200° C. for 1 hour, to obtain a fuel-cell separator having a good appearance and excellent strength.

Examples 26 to 28
(Investigation of Production of Tablet)

Example 26

(1) Production of Expanded-Graphite Powder

The procedure of Example 1(1) was repeated to obtain an expanded-graphite powder of 150 μm in average particle diameter, 1.0 g/cm³ in density and 0.15 g/cm³ in bulk density.

(2) Production of Ring-Opening-Polymerizable Phenolic Resin (resin containing dihydrobenzoxazine rings)

A phenolic resin was produced in the same manner as in Example 1(2).

(3) Molding of Tablet 70 g of the expanded-graphite powder produced in Example 26(1) and 30 g of the powdery phenolic resin produced in (2) (expanded-graphite powder/resin=70/30 (weight ratio)) were placed in a plastic film bag. The bag was inflated with air, and dry blending was carried therein for about 30 seconds.

20 g (1.3 g/cm³ in density of the finally molded article) of the powder mixture was evenly charged into a plate-molding mold (150 mm long and 100 mm wide) heated to 100° C. The mold was put on a hot plate heated to 100° C., and molding was carried out with a 70-ton compression molding machine with a bearing pressure of 2 MPa for a molding time of 20 minutes. After completion of the molding, a 3.3 mm thick tablet, which was easy to handle, was removed from the mold.

(4) Production of Fuel-Cell Separator

A mold for molding a single-side ribbed fuel-cell separator (150 mm long, 100 mm wide, 25 projections for forming ribs of 2mm in height (A), plate thickness B: 0.5 mm, groove width Y: 2 mm, rib width X: 2 mm, rib taper: 10°) was heated to 180° C., and the tablet obtained in (3) was loaded therein. The mold was put on a hot plate heated to 180° C., and molding was carried out with a 70-ton compression molding machine with a bearing pressure of 6 MPa for a molding time of 10 minutes. The molded article was post-cured at 200° C. for 30 minutes, to obtain the final molded article, fuel-cell separator.

Example 27

A 3.5 mm thick tablet was produced from the same materials as used in Example 26 by the same procedure as in Example 26 except that the temperature at which the powder mixture produced in Example 26(3) was charged and molded was changed to 130° C. and that the molding pressure and time were changed to a bearing pressure of 1 MPa and 10 minutes respectively, and a fuel-cell separator was produced therefrom by the same procedure as in Example 26(4).

Example 28

20 g of the powder mixture obtained in Example 26(3) was not molded into a tablet but directly charged in a mold which is for molding a single-sided ribbed fuel-cell separator and had been heated to 180° C., and was molded into a fuel-cell separator by the same procedure as in Example 26(4).

Evaluation

As to Examples 26–28, the handling properties of the tablets, the time required to load or charge the materials at the time of final molding, and the appearances and dimensional accuracy of the fuel-cell separators were evaluated. The results are listed in Table 8.

TABLE 8

|  | Example 26 | Example 27 | Example 28 |
|---|---|---|---|
| Handling properties of tablet | Good | Good | Tablet was not produced. |
| Time required to load or charge material (at the time of final molding) | 1 to 2 seconds | 1 to 2 seconds | 30 seconds |
| Appearance of finally molded article | Good | Good | Some parts had low density. |
| Dimensional accuracy of finally molded article | +0.05 | +0.03 | +0.08 |
| rib height (2 mm) | −0.03 | −0.01 | −0.06 |

Handling properties of tablet: the appearance of the molded article remove from the mold; and the fragility of the molded article being handled Time required for loading or charging a material: the time required to load a tablet or charge a powder mixture in a fuel-cell separator molding-mold Appearance of finally molded article: visual observation Dimensional accuracy of finally molded article: 10 ribs were chosen, and the heights of the ribs were measured with a micrometer at three points per rib, an upper part, a middle part and a lower part, and were averaged.

Examples 29 to 32
(Investigation of Bending Strength)

Example 29

(1) Production of Expanded-Graphite Powder

The procedure of Example 20(1) was repeated to obtain an expanded-graphite powder of 130 μm in average particle diameter and 0.17 g/cm³ in bulk density.

(2) Production of Ring-Opening-Polymerizable Phenolic Resin (resin containing dihydrobenzoxazine rings)

A phenolic resin was produced in the same manner as in Example 1(2). The resin was pulverized with a pulverizer to produce a powdery phenolic resin (average particle diameter: 13 μm) which generates little gases on reaction.

(3) Production of Fuel-Cell Separator

Into a plastic film bag were placed 39.2 g of the expanded-graphite powder produced in (1), 16.8 g of a short carbon fiber A-6000 (trade name, produced by Asahi Chemical Carbon Fiber Co., Ltd., average diameter: 7 μm, average length: 6 mm) (expanded-graphite powder/short carbon fiber=70/30, weight ratio) and 24 g of the phenolic resin which was produced in (2) (carbon ingredients/resin=70/30) and can react through ring-opening-polymerization. The bag was inflated with air, and dry blending was carried therein for about 1 minute.

The powder mixture was charged into a fuel-cell separator-molding mold heated to 180° C., and molded at a molding temperature of 180° C. with a molding pressure (bearing pressure) of 6 MPa for 10 minutes, to produce a 140 mm long and 180 mm wide single-side ribbed fuel-cell separator (rib height A: 2 mm, plate thickness B: 0.5 mm, groove width Y: 2 mm, rib width X: 2 mm, rib taper: 10°).

The fuel-cell separator was sandwiched between two 3 mm thick iron plates, and placed in a drier heated to 200° C. and heated therein for 60 minutes.

Example 30

A fuel-cell separator was produced in the same manner as in Example 29(3) except that the amounts of the expanded-graphite powder produced in Example 29(1) and the short carbon fiber A-6000 used in Example 29 were changed to 44.8 g and 11.2 g, respectively (expanded-graphite powder/short carbon fiber=80/20).

Example 31

A fuel-cell separator was produced in the same manner as in Example 29(3) except that the amounts of the expanded-graphite powder produced in Example 29(1) and the short carbon fiber A-6000 used in Example 29 were changed to 50.4 g and 5.6 g, respectively (expanded-graphite powder/short carbon fiber=90/10).

Example 32

A fuel-cell separator was produced in the same manner as in Example 29(3) except that the amount of the expanded-graphite powder produced in Example 29(1) was changed to 56 g, and that the short carbon fiber was not used.

Evaluation

The appearance and moldability of the fuel-cell separators produced in Examples 29 to 32 were evaluated. Further, the powder mixtures prepared in Examples 29 to 32 were molded into 1.5 mm thick plates by the same procedures as of their respective Examples except that a flat-bottomed mold was used, and were tested for bending strength. The results are listed in Table 9.

TABLE 9

|  | Example 29 | Example 30 | Example 31 | Example 32 |
|---|---|---|---|---|
| Appearance of fuel-cell separator | ○ | ○ | ○ | ○ |
| Moldability (releasability from mold) | ○ | ○ | ○ | ○ |
| Bending strength (MPa) | 65 | 58 | 57 | 45 |

*Appearance (moldability): The surfaces were visually observed. ○ indicates a well smoothed surface, and X indicates a defective surface such as a rough surface.
Moldability: ○ indicates a faultless shape, and X indicates a shape partially chipped off.
Bending strength: 20 mm wide and 1.5 mm thick specimens were tested (23° C.) by using an autograph (AG-5000B produced by Shimazu Corp.) adjusted to 20 mm in span and 1 mm/1 min in rate, and then bending strengths were calculated.

Examples 33 to 34
(Investigation of Phosphoric Acid-Fuel-Cell Separator)

Example 33

(1) Production of Expanded-Graphite Powder

The procedure of Example 20(1) was repeated to produce an expanded-graphite powder of 130 μm in average particle diameter and 0.17 g/cm$^3$ in bulk density.

(2) Production of Ring-Opening-Polymerizable Phenolic Resin (resin containing dihydrobenzoxazine rings)

A phenolic resin was produced in the same manner as in Example 1(2).

(3) Production of Phosphoric Acid-Fuel-cell Separator 80 g of the expanded-graphite powder produced in Example 33(1) and 20 g of the powdery phenolic resin produced in (2) (expanded-graphite powder/phenolic resin =80/20 (weight ratio)) were placed in a plastic film bag. The bag was inflated with air, and dry blending was carried therein for 1 minute. The resulting powder mixture was a uniform mixture of the materials.

A 20 g portion of the powder mixture was charged evenly into a fuel-cell separator-molding mold heated to 180° C., and molded with a 70-ton compression molding machine heated to 180° C. with a bearing pressure of 6 MPa for a molding time of 10 minutes.

The obtained fuel-cell separator had ribs on one side, was 140 mm in length, 180 mm in width, 1.3 g/cm$^3$ in density and had a good appearance (rib height A: 2 mm, plate thickness B: 0.5 mm, groove width Y: 2 mm, rib width X: 2 mm, rib taper: 10°).

The fuel-cell separator obtained as above was sandwiched between two 3 mm thick iron plates, and heated for 1 hour in a drier heated to 200° C. to allow the resin contained in the molded article to react almost completely. The resulting molded article was fixed with a jig for preventing deformation, placed in a muffle furnace of an industrial nitrogen atmosphere heated to 250° C., heated up to 400° C. in 2 hours, and heat treated for 10 hours at 500° C., to carbonize the resin (carbonization). The carbonized phosphoric acid-fuel-cell separator had a good appearance free of blistering or cracks.

Example 34

A phosphoric acid-fuel-cell separator was produced from the same materials as of Example 33 by the same procedure as of Example 33, except that the conditions of the heat treatment in the muffle furnace were changed so that the temperature was raised to 800° C. in 3 hours, and the heat treatment was then carried out at 800° C. for 10 hours.

The obtained phosphoric acid-fuel-cell separator, as well as that of Example 33, had a good appearance and involved no particular problems.

Evaluation

Specimens of 5 mm×5 mm×2 mm thick were cut out from the fuel-cell separators produced in Examples 33 to 34, dipped in phosphoric acid heated to 200° C., to examine the change in appearance and specific resistances. The results are listed in Table 10. The treatment with phosphoric acid was carried out by dipping the specimens for 8 hours in phosphoric acid heated to 200° C., allowing them to stand in a large amount of water for 30 minutes, then washing sufficiently with water, and finally drying under reduced pressure at 110° C. for 2 hours.

TABLE 10

|  |  | Example 33 | Example 34 |
|---|---|---|---|
| Before treatment with phosphoric acid | Appearance specific resistance ($\mu\Omega \cdot m$) | Good 22 | Good 17 |
| After treatment with phosphoric acid | Appearance specific resistance ($\mu\Omega \cdot m$) | Good 18 | Good 10 |

*Appearance: visual observation
*Specific resistance: perpendicular direction

Examples 35 and 36
(Investigation of the Shape and Dispersed State of Expanded-graphite)

Example 35

(1) Production of Expanded-Graphite Powder 650 g of sulfuric acid (concentration: 99 wt %) and 250 g of nitric acid (concentration: 99 wt %) were placed in a 3-liter glass beaker. Added thereto was 500 g of a graphite F48C (trade name, produced by Nippon Kokuen Co., Ltd., fixed carbon: 99 wt % or more). After agitation for 10 minutes with an agitation motor (60 rpm) equipped with glass blades, 32 g of an aqueous hydrogen peroxide solution (concentration: 35 wt %) was added, and agitation was resumed for 15 minutes. After completion of the agitation, the resulting oxidized graphite was separated from the acid components by filtration under reduced pressure, transferred to another vessel and agitated with large agitating blades for 10 minutes together with 5 liters of water added thereto. The washed, oxidized graphite was separated from the washing water by filtration under reduced pressure.

The washed, oxidized graphite was transferred into an enameled bat, leveled, and heated for 20 minutes in a vacuum drier heated to 110° C. to remove water. It was then further heated for 5 minutes in a heating furnace heated to 800° C. to obtain an expanded-graphite. After cooling, the expanded-graphite was rolled using rollers to obtain a sheet of 1.0 g/cm$^3$ in density. The sheet was pulverized with a coarse pulverizer (trade name: ROTOPLEX, produced by Hosokawa Micron Co., Ltd.) and then with a pulverizer (trade name: JIYUFUNSAIKI M-3, produced by Nara Kikai Seisakusho Co., Ltd.), to obtain a pulverized powder of an expanded-graphite sheet, which was 150 μm in average particle diameter and 0.2 g/cm$^3$ in bulk density. Observation of the electron micrograph of the pulverized expanded-graphite powder showed that it had a flaky branched-needle-like shape or a dendritic shape as shown in FIG. 7.

(2) Resin

A powdery resol non-modified phenolic resin TD-2040C (produced by Dainippon Ink & Chemicals, Inc., average particle diameter: 30 μm) was used as a thermosetting resin.

(3) Production of Tablet for Molding 400 g of the pulverized powder of the expanded-graphite sheet obtained in Example 35(1) and 120 g of the powdery resin of (2) (pulverized powder/resin=70/30 (weight ratio)) were placed in a plastic film bag. The bag was inflated with air, and blending was carried therein for about 1 minute. Subsequently, a 150 mm wide, 150 mm long and 3 mm thick sheet made of uniformly dispersed powder was produced by using a machine for forming a mixture sheet comprising a hopper (a material container) equipped with a vibrator, a conveyer belt and compression rolls.

The sheet was sandwiched between iron plates coated with a release agent to prevent it from crumbling, and heated in a drier under the conditions of 120° C.-5 minutes (pressure: about 0.5 MPa).

A 120 mm long and 100 mm wide tablet for molding was cut out from the heat-treated sheet by using a cutter.

(4) Production of Molded Article (Fuel-Cell Separator)

A fuel-cell separator molding mold (120 mm long, 100 mm wide, 20 ribs (on one side) of 1.5 mm in height (A), plate thickness B: 0.5 mm, groove width Y: 2.5 mm, rib width X: 2.5 mm, rib taper: 3°) was heated to 160° C., and the tablet obtained in (3) was loaded therein, and molded with a 76-ton compression molding machine with a bearing pressure of 6 MPa for a molding time of 10 minutes (including one degassing). The molded article thus obtained was sandwiched between iron plates and post-cured at 200° C. for 1 hour.

FIG. 8B, FIG. 8C, FIG. 9A and FIG. 9B show the electron micrographs of a section of the molded article obtained in (4). The electron micrographs show that the pulverized powder that was made from an expanded-graphite sheet and used as an electric conductor formed entangled fibrous rows and partially oriented along the surface of the external shape.

Example 36

A molded article was produced using the same materials and method used in Example 35(2), (3) and (4) except that a graphite KS-75 (trade name, produced by Ronsa Co., Ltd.) of 65 μm in average particle diameter was used in place of the pulverized powder that was made from an expanded-graphite sheet and used in Example 35. When removed from the mold, the molded article developed cracks and crumbled. In a section of the molded article, the graphite was observed to be dispersed uniformly in the molded article, but orientation of the graphite was not observed.

Evaluation

As to Examples 35 and 36, the results of evaluations of orientation of the electric conductors and the strength of the molded articles on removal from molds are listed in Table 11.

TABLE 11

| | Example 35 | Example 36 |
|---|---|---|
| Orientation of electric conductor | Tangled fibrous materials were oriented along the surface of the external shape. | The electric conductor was uniformly dispersed. |
| Strength on removal from mold | No troubles | cracked and crumbled |

Examples 37 to 40
(Investigation of Concentrations of Residual Carbolic Acid and Sulfuric Acid Ions in Fuel-Cell Separator)

Example 37

(1) Production of Pulverized Powder from Expanded-graphite Sheet 650 g of sulfuric acid (concentration: 99 wt %) and 250 g of nitric acid (concentration: 99 wt %) were placed in a 3-liter glass beaker. Added thereto was 500 g of a graphite F48C (trade name, produced by Nippon Kokuen Co., Ltd., fixed carbon: 99 wt % or more). After agitation for 10 minutes with an agitation motor (rotations: 60 min$^{-1}$) equipped with glass agitation blades, 32 g of an aqueous hydrogen peroxide solution (concentration: 35 wt %) was added, and agitation was resumed for 15 minutes. After completion of the agitation, the resulting oxidized graphite was separated from the acid components by filtration under reduced pressure, transferred to another vessel and agitated with large agitating blades for 10 minutes together with 3 liters of water added thereto. The washed, oxidized graphite was separated from the washing water by filtration under reduced pressure.

The washed, oxidized graphite was transferred into an enameled bat, leveled, and heated for 20 minutes in a vacuum drier heated to 110° C. to remove water. It was then further heated for 5 minutes in a heating furnace heated to 800° C. to obtain an expanded-graphite. After cooling, the expanded-graphite was rolled using rollers to obtain a sheet of 1.0 g/cm³ in density.

The sheet was pulverized with a coarse pulverizer (trade name: ROTOPLEX, produced by Hosokawa Micron Co., Ltd.) and then with a pulverizer (trade name: JIYUFUN-SAIKI M-3, produced by Nara Kikai Seisakusho Co., Ltd.), to obtain a pulverized powder made from an expanded-graphite sheet. The powder was 150 μm in average particle diameter and 0.15 g/cm³ in bulk density.

(2) Production of Expanded-Graphite Powder with Decreased Residual Sulfuric Acid Ions 100 g of the pulverized powder of an expanded-graphite sheet produced in Example 37(1) was placed in a 5-liter glass beaker, agitated for 30 seconds with a glass rod together with 3-liter of hot water of 60° C. added thereto, to mix it with the hot water, and then agitated with an agitator for 5 minutes at 30 rpm. After completion of the agitation, a washed expanded-graphite powder was collected on a filter paper on a funnel by filtration under reduced pressure. The collected pulverized powder was transferred to an enameled bat, leveled, placed in a vacuum drier heated to 130° C., dried for 1 hour therein under a vacuum of 730 mmHg, to obtain an expanded-graphite powder of 125 μm in average particle diameter and 0.17 g/cm³ in bulk density containing decreased sulfuric acid ions.

(3) Production of Molded Article 70 g of the expanded-graphite powder produced in Example 37(2) and 30 g of a powdery non-modified resol phenolic resin TD-2040C (produced by Dainippon Ink & Chemicals, Inc.) was placed in a plastic film bag. The bag was inflated with air, and mixing was carried out for 1 minute. In the obtained powder mixture, the materials were uniformly mixed with each other.

A 25 g portion of the powder mixture was charged in a separator-molding mold heated to 180° C., and molded with a 70-ton compression molding machine heated to 180° C. with a bearing pressure of 6 MPa for a molding time of 8 minutes. The resulting molded article was post-cured under the conditions of 220° C./2 hours, to obtain a molded, ribbed fuel-cell separator of 140 mm long, 160 mm wide and 1.5 g/cm³ in density, which had on one side 12 rib-shaped projections of 1.5 mm height and had a good appearance.

Example 38

(1) Production of Pulverized Powder of Expanded-graphite Sheet

The powder produced in Example 37(1) was used.

(2) Production of Expanded-Graphite Powder with Decreased Residual Sulfuric Acid Ions 100 g of the pulverized powder that was made in Example 37(1) from an expanded-graphite sheet was heated for 3 hours in a muffle furnace heated to 500° C., to obtain an expanded-graphite powder of 150 μm in average particle diameter and 0.17 g/cm³ in bulk density containing decreased sulfuric acid ions.

(3) Production of Molded Article

A molded, ribbed fuel-cell separator with a good appearance was produced by using the same components, method and post-cure conditions as those of Example 37(3) except that 70 g of the expanded-graphite powder produced in Example 38(2) was used.

Example 39

(1) Production of Pulverized Powder of Expanded-Graphite Sheet

The powder produced in Example 37(1) was used.

(2) Production of Expanded-Graphite Powder

The expanded-graphite powder produced in Example 37(1) was used as it was. The expanded-graphite powder was 150 μm in average particle diameter and 0.15 g/cm³ in bulk density.

(3) Production of Molded Article

A molded, ribbed fuel-cell separator of the same shape was produced by using the same components and method as those of Example 37(3) except that the expanded-graphite powder described in Example 37(2) was used.

Example 40

(1) Production of Pulverized Powder of Expanded-Graphite Sheet

The powder produced in Example 37(1) was used.

(2) Production of Expanded-Graphite Powder

The expanded-graphite powder produced in Example 37(2) was used as it was.

(3) Production of Molded Article

A molded, ribbed fuel-cell separator was produced in the same manner as in Example 37(3) except that the post-cure conditions were changed to 180° C./1 hour.

Example 41

(1) Production of Pulverized Powder of Expanded-Graphite Sheet

The powder produced in Example 37(1) was used.

(2) Production of Expanded-Graphite Powder

The expanded-graphite powder produced in Example 37(1) was used as it was. The graphite powder was 150 μm in average particle diameter and 0.15 g/cm³ in bulk density.

(3) Production of Molded Article

A molded, ribbed fuel-cell separator was produced in the same manner as in Example 37(3) except that the post-cure conditions were changed to 180° C./1 hour.

Evaluation

The concentrations of sulfuric acid ions and carbolic acid in the molded fuel-cell separators produced in Examples 37 to 41 were determined. The results are listed in Table 12. Further, the molded fuel-cell separators were dipped in a hot water of 80° C. for 24 hours, and then the percentages of water absorption were determined.

TABLE 12

|  | Example 37 | Example 38 | Example 39 | Example 40 | Example 41 |
| --- | --- | --- | --- | --- | --- |
| Concentration of sulfuric acid ions (ppm) | 25 | 65 | 230 | 28 | 240 |
| Concentration of carbolic acid (ppm) | 21 | 25 | 23 | 170 | 170 |
| Percentage of water absorption (%) | 0.3 | 1.1 | 4.1 | 2.8 | 4.7 |

The fuel-cell separators of Examples 37 and 38 had good appearances. The appearances of the fuel-cell separators of Examples 39 and 40 were somewhat inferior to those of Examples 37 and 38. As to Example 41, the mold was partially changed to white, and the appearance of the fuel-cell separator was inferior to those of Examples 37 and 38.

The fuel-cell separators of Examples 37 and 38 were also extremely resistive to water absorption and excellent in electrical properties and durability, while the fuel-cell separators of Examples 39 to 41 had the defects as described above.

Assay System

1. Extractions of Sulfuric Acid Ions and Carbolic Acid (1) Two 20 mm×40 mm specimens were cut out from each molded article, placed in two 50-ml screw-tube bottles, respectively, and weighed. After the specimens were pulverized into powders of about 500 μm in average particle diameter, 32 g of pure water (ion-exchanged water+distilled water) was added to each bottle and sealed. The bottles were placed in a drier kept at 85° C., and heating and extraction were carried out for 24 hours to obtain extracted solutions.

(2) Determination of the Quantity of Carbolic Acid

The quantities of carbolic acid in the extracted solutions were determined by using a gas chromatogram with a carbolic acid standard solution (10 ppm).

Measuring instrument: HITACHI G3000 (a gas chromatograph apparatus, produced by Hitachi, Ltd.)

Measuring conditions: column: TC-WAX 0.5 mmϕ×30 m, carrier gas: He, column temperature: 60° C. (5 min.)–200° C. (15/min.), inlet temperature: 250° C., detector temperature: 250° C., Detector: FID, sample: 1.0 μl (3) Determination of the quantity of sulfuric acid ions A calibration curve of sulfuric acid ions was made, and used to determine the quantities of sulfuric acid ions in the extracted solutions.

Measuring instrument: IC-7000 Ion-Chromatograph produced by Yokokawa Denki Co., Ltd. (column: Excelpack ICS-A23, detector: conductivity detector, eluant: 3.0 mM $Na_2CO_3$, suppressor: 15.0 mM $H_2SO_4$, flow rate: 1.0 ml/min., injection: 10 μl addition: fuel-cell separator

INDUSTRIAL APPLICABILITY

The fuel-cell separator of the invention has satisfactory fuel-cell separator properties, such as electric resistance, gas permeability, swelling with liquids and mechanical strength, and good moldability, and is very economical.

Further, the fuel-cell separator of the invention can be lightened since it can have thin plate part even for high ribs.

Further, the fuel-cell separator of the invention is excellent in dimensional accuracy.

Further, the fuel-cell separator of the invention is particularly excellent in electrical properties and mechanical strength.

By the production method of the invention, a fuel-cell separator having satisfactory fuel-cell separator properties, such as electric resistance, gas permeability, swelling in liquids and mechanical strength, and good moldability can be produced economically and stably through simple steps.

According to the production method of the invention, curability of resins can be improved, and a fuel-cell separator can be produced without problems, such as corrosion of molds.

Being produced by using fuel-cell separators which are excellent in properties, such as electric resistance, gas permeability, swelling in liquid and mechanical strength, the fuel cell of the invention is highly efficient.

Further, the fuel cell of the invention maintains stable cell properties even if the fuel-cell separators are used for a long term.

What is claimed:

1. A fuel-cell separator comprising (A) a cured phenolic resin resulting from ring-opening-polymerization of a phenolic resin containing a dihydrobenzoxazine ring, and (B) an expanded-graphite powder, or the expanded-graphite powder and a carbon fiber, dispersed in the cured phenolic resin, wherein said expanded-graphite powder is a powder obtained by pulverizing a molded expanded-graphite.

2. The fuel-cell separator according to claim 1, wherein the expanded-graphite powder has an average particle diameter of 25 μm or more.

3. The fuel-cell separator according to claim 2, wherein the expanded-graphite powder has a sulfuric acid ion ($SO_4^{2-}$) concentration of 550 ppm or less.

4. The fuel-cell separator according to claim 1, wherein the expanded-graphite powder has a sulfuric acid ion ($SO_4^{2-}$) concentration of 500 ppm or less.

5. A fuel cell having the fuel-cell separator of claim 1.

6. The fuel cell according to claim 5, which is a solid-polymer fuel cell.

7. The fuel-cell separator according to claim 1, which has a shape of a ribbed-plate formed by monobloc-molding a plate and ribs.

8. The fuel-cell separator according to claim 7, wherein the ribs have a height of 0.3 mm or more.

9. The fuel-cell separator according to claim 7, wherein the ribs have a height of 0.6 mm or more.

10. The fuel-cell separator according to claim 7, wherein the ratio of the height (A) of the ribs to the thickness (B) of the plate (A/B) is 0.5 or more.

11. The fuel-cell separator according to claim 7, which has the ribs on one side of the plate.

12. The fuel-cell separator according to claim 7, which has the ribs on both sides of the plate.

13. The fuel-cell separator according to claim 7, wherein the plate has a thickness of 0.25 mm to 2.0 mm.

14. The fuel-cell separator according to claim 7, wherein the ribs are tapered at an angle of 2° to 30°.

15. The fuel-cell separator according to claim 14, wherein the ribs are tapered at an angle of 20° to 20°.

16. The fuel-cell separator according to claim 1, which has a bending strength of 30 MPa or more.

17. The fuel-cell separator according to claim 1, which comprises the carbon fiber and the expanded-graphite powder.

18. The fuel-cell separator according to claim 1, wherein the expanded-graphite powder has a flaky branched-needle-like shape or a dendritic shape.

19. The fuel-cell separator according to claim 1, wherein the dispersed expanded-graphite powder is oriented partially in a direction of the thickness of the fuel-cell separator and partially in a direction perpendicular to the direction of the thickness of the fuel-cell separator.

20. The fuel-cell separator according to claim 1, which has a surface in and near which the dispersed expanded-graphite powder is oriented along the surface of the fuel-cell separator.

21. The fuel-cell separator according to claim 1, wherein the dispersed expanded-graphite powder lies in fibrous rows.

22. The fuel-cell separator according to claim 1, wherein the dispersed expanded-graphite powder lies in tangled fibrous rows.

23. The fuel-cell separator according to claim 1, which is adapted to be used in a solid-polymer fuel cell.

24. The fuel-cell separator according to claim 1, which has a residual carbolic acid concentration of 100 ppm or less.

25. The fuel-cell separator according to claim 1, which has a residual sulfuric acid ion ($SO_4^{2-}$) concentration of 200 ppm or less.

26. A phosphoric acid-fuel-cell separator produced from the fuel-cell separator of claim 1 by carbonizing the cured phenolic resin contained in the fuel-cell separator.

27. A fuel cell having the fuel-cell separator of claim 26.

28. A fuel cell having the fuel-cell separator of claim 16.

29. A fuel cell according to claim 28, which is a solid-polymer fuel cell.

30. The fuel cell separator according to claim 19, wherein the oriented expanded-graphite powder lies in fibrous rows.

31. The fuel-cell separator according to claim 1, wherein the (A) cured phenolic resin and (B) expanded-graphite powder, or expanded-graphite powder and carbon fiber, are included in a weight ratio ((A)/(B)) of 95/5 to 30/70.

32. The fuel-cell separator according to claim 31, wherein said weight ratio is 90/10 to 70/03.

33. A method of producing the fuel-cell separator of claim 1, comprising thermally molding a mixture comprising (A) the phenolic resin, which contains a dihydrobenzoxazine ring and is curable by the thermal molding through ring-opening-polymerization to form the cured phenolic resin, and (B) said expanded-graphite powder, or said expanded-graphite powder and said carbon fiber.

34. The method according to claim 33 for producing the fuel-cell separator, wherein the expanded-graphite powder has a bulk density of 0.1 to 1.0 g/cm$^3$.

35. The method according to claim 33 for producing the fuel-cell separator, wherein the mixture comprises the carbon fiber and the expanded-graphite powder.

36. The method according to claim 33 for producing the fuel-cell separator, wherein the expanded-graphite powder has an average particle size of at least 25 μm.

37. The method according to claim 33 for producing the fuel-ell separator, wherein the molded expanded-graphite has a density of 0.6 to 2.0 g/cm$^3$.

38. The method according to claim 33 for producing the fuel-cell separator, wherein the phenolic resin has a softening point of 300° C. or lower.

39. The method according to claim 33 for producing the fuel-cell separator, wherein the expanded-graphite powder has a sulfuric acid ion ($SO_4^{2}$) concentration of 500 ppm or less.

40. The method according to claim 39 for producing the fuel cell separator, wherein the expanded-graphite powder is obtained by pulverizing a molded expanded-graphite, washing it with water and drying.

41. The method according to claim 39 for producing the fuel cell separator, wherein the expanded-graphite powder is obtained by heat-treating a molded expanded-graphite at a temperature of 350° C. or higher and then pulverizing it after cooling.

42. The method according to claim 39 for producing the fuel-cell separator, wherein the expanded-graphite powder is obtained by pulverizing a molded expanded-graphite and then heat-treating it at a temperature of 350° C. or higher.

43. The method according to claim 33 for producing the fuel-cell separator, wherein the fuel-cell separator has a shape of a ribbed-plate, and wherein the thermal molding is accomplished out by monobloc-molding ribs and a plate.

44. The method according to claim 33 for producing the fuel-cell separator, comprising:

a pre-molding step wherein the mixture is compressed at a temperature at which the phenolic resin does not melt nor cure; and a thermal molding step wherein a pre-molded article produced in the pre-molding step is compressed at a temperature at which the phenolic resin melts or cures.

45. The method according to claim 44 for producing the fuel-cell separator, wherein the pre-molding is carried out at a temperature not lower than 0° C. but lower than 80° C.

46. The method according to claim 33 for producing the fuel-cell separator, wherein the thermal molding of the mixture is accomplished out by molding the mixture into a tablet, which is then molded at a higher temperature under a higher pressure than the temperature and pressure employed in the molding for producing the tablet.

47. The method according to claim 46 for producing the fuel-cell separator, wherein the molding for producing the tablet is carried out at a temperature at which the phenolic resin partially melts or reacts with heat.

48. The method according to claim 33 for producing the fuel-cell separator, wherein the fuel-cell separator is adapted to be used in a solid-polymer fuel cell.

49. The method according to claim 33 for producing the fuel-cell separator, wherein a molded article obtained by the thermal molding is further heated at a temperature of 200° C. to 300° C.

50. A fuel cell having the fuel-cell separator produced by the production method of claim 33.

51. The fuel cell according to claim 50, which is a solid-polymer fuel cell.

52. A method of producing the fuel-cell separator of claim 26 adapted to be used in a phosphoric acid-type fuel cell, comprising thermally molding a mixture comprising (A) the phenolic resin containing a dihydrobenzoxazine ring, and being curable by the thermal molding through ring-opening-polymerization to form the cured phenolic ring, and (B) said expanded-graphite powder, or said expanded-graphite powder and said carbon fiber, and then carbonizing the cured phenolic resin.

53. A fuel cell having the phosphoric acid-type fuel-cell separator produced by the production method of claim 52.

* * * * *